(12) United States Patent
Abbaszadeh et al.

(10) Patent No.: US 11,170,314 B2
(45) Date of Patent: Nov. 9, 2021

(54) DETECTION AND PROTECTION AGAINST MODE SWITCHING ATTACKS IN CYBER-PHYSICAL SYSTEMS

(71) Applicant: General Electric Company, Schenectady, NY (US)

(72) Inventors: Masoud Abbaszadeh, Clifton Park, NY (US); Fernando D'Amato, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 492 days.

(21) Appl. No.: 16/166,417

(22) Filed: Oct. 22, 2018

(65) Prior Publication Data
US 2020/0125978 A1    Apr. 23, 2020

(51) Int. Cl.
*G06F 7/60* (2006.01)
*G06N 7/00* (2006.01)
(Continued)

(52) U.S. Cl.
CPC .............. *G06N 7/005* (2013.01); *G06F 9/542* (2013.01); *G06F 17/16* (2013.01); *G06F 17/18* (2013.01);
(Continued)

(58) Field of Classification Search
CPC ...................................................... G06N 7/005
(Continued)

(56) References Cited

U.S. PATENT DOCUMENTS

| | | |
|---|---|---|
| 9,680,855 B2 | 6/2017 | Schultz et al. |
| 9,912,733 B2 | 3/2018 | T et al. |

(Continued)

FOREIGN PATENT DOCUMENTS

CN    102938024 B    3/2016

OTHER PUBLICATIONS

Yu, Shun-Zheng et al., "A hidden semi-Markov model with missing data and multiple observation sequences for mobility tracking", Signal Processing, vol. 83, Issue: 2, Feb. 2003, (pp. 235-250, 16 total pages).

(Continued)

*Primary Examiner* — Timothy A Mudrick
(74) *Attorney, Agent, or Firm* — Buckley, Maschoff & Talkwalkar LLC

(57) ABSTRACT

A cyber-physical system may have a plurality of monitoring nodes each generating a series of current monitoring node values over time that represent current operation of the cyber-physical system. According to some embodiments, a features extraction computer platform may receive the series of current monitoring node values over time and generate current feature vectors based on the series of current monitoring mode values. A system mode estimation computer platform may provide the current feature vectors to a probabilistic graphical model to generate an estimated system mode. The system mode estimation computer platform may then compare the estimated system mode with a currently reported system mode output by the cyber-physical system and generate a system mode status indication based on a result of said comparison. According to some embodiments, the system mode status indication can be used to override the currently reported system mode of the cyber-physical system.

21 Claims, 30 Drawing Sheets

(51) Int. Cl.
   *G06K 9/62* (2006.01)
   *G06F 9/54* (2006.01)
   *G06F 17/16* (2006.01)
   *H04L 12/26* (2006.01)
   *G06F 17/18* (2006.01)

(52) U.S. Cl.
   CPC ........ *G06K 9/6297* (2013.01); *H04L 43/0817* (2013.01)

(58) Field of Classification Search
   USPC .......................................................... 703/2
   See application file for complete search history.

(56) References Cited

U.S. PATENT DOCUMENTS

| | | |
|---|---|---|
| 2013/0132149 A1 | 5/2013 | Wei et al. |
| 2016/0328654 A1* | 11/2016 | Bauer .................. G06K 9/6267 |
| 2017/0220801 A1 | 8/2017 | Stockdale et al. |
| 2017/0230410 A1 | 8/2017 | Hassanzadeh et al. |
| 2018/0157831 A1 | 6/2018 | Abbaszadeh et al. |
| 2018/0255379 A1 | 9/2018 | Cella et al. |
| 2018/0276375 A1* | 9/2018 | Arov .................. G05B 19/4185 |

OTHER PUBLICATIONS

Sarkar, S. et al., "Chapter 18—Probabilistic Graphical Modeling of Distributed Cyber-Physical Systems", Cyber-Physical Systems, 2017, DOI: 10.1016/B978-0-12-803801-7.00018-3, (pp. 265-285, 21 total pages).

* cited by examiner

DETECTION AND PROTECTION AGAINST MODE SWITCHING ATTACKS IN CYBER-PHYSICAL SYSTEMS

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.) that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or even catastrophic damage to a plant. Currently, no methods are available to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). It may also be important to determine when a monitoring node is experiencing a fault (as opposed to a malicious attack) and, in some cases, exactly what type of fault is occurring. Existing approaches to protect an industrial control system, such as failure and diagnostics technologies, may not adequately address these problems—especially when multiple, simultaneous attacks and/faults occur since such multiple faults/failure diagnostic technologies are not designed for detecting stealthy attacks in an automatic manner.

One type of cyber-attack, referred to as a "mode switching attack," can be particularly harmful. In a mode switching attack, an adversary changes a controller mode of operation. For example, a wind turbine might be moved from a below-rated mode (e.g., associated with a partial load) to an above-rated mode (e.g., associated with a full load). The could result in the loss of power generation, a system shut down, or even sever damage to the turbine. It may therefore be desirable to help detect cyber-physical system mode switching attacks in an automated and accurate manner.

SUMMARY

According to some embodiments, a cyber-physical system may have a plurality of monitoring nodes each generating a series of current monitoring node values over time that represent current operation of the cyber-physical system. According to some embodiments, a features extraction computer platform may receive the series of current monitoring node values over time and generate current feature vectors based on the series of current monitoring mode values. A system mode estimation computer platform may provide the current feature vectors to a probabilistic graphical model to generate an estimated system mode. The system mode estimation computer platform may then compare the estimated system mode with a currently reported system mode output by the cyber-physical system and generate a system mode status indication based on a result of said comparison. According to some embodiments, the system mode status indication can be used to override the currently reported system mode of the cyber-physical system.

Some embodiments comprise: means for receiving, at a features extraction computer platform, a series of current monitoring node values over time; means for generating, by the features extraction computer platform, current feature vectors based on the series of current monitoring mode values; means for providing, by a system mode estimation computer platform, the current feature vectors to a probabilistic graphical model to generate an estimated system mode; means for comparing, by the system mode estimation computer platform, the estimated system mode with a currently reported system mode output by the cyber-physical system; and means for generating, by the system mode estimation computer platform, a system mode status indication based on a result of said comparison.

Some technical advantages of some embodiments disclosed herein are improved systems and methods to protect one or more cyber-physical systems from mode switching attacks in an automatic and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
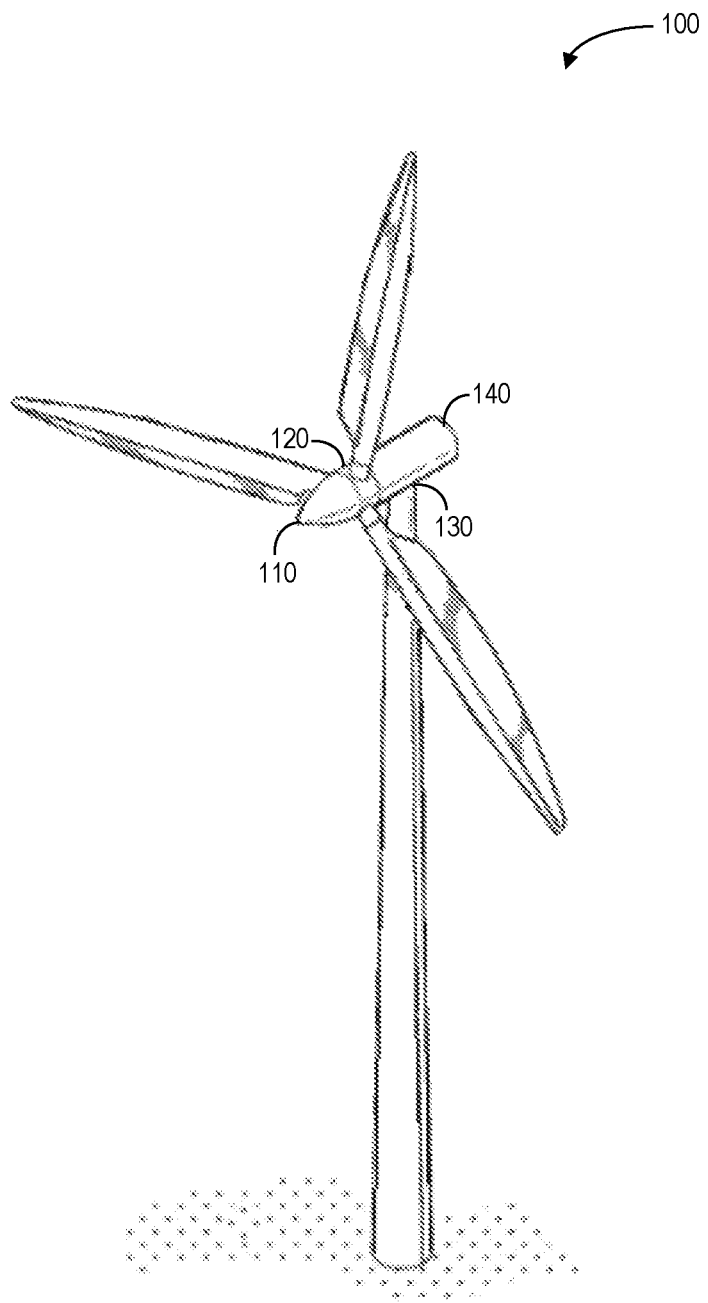
FIG. 1 illustrates examples of cyber-attack vulnerabilities in a wind turbine.

Cyber-physical systems may be vulnerable to many different types of cyber-attacks. For example, FIG. 1 illustrates examples of cyber-attack vulnerabilities in a wind turbine 100. With respect to pitch systems 110, an adversary might inject large individual pitch commands to cause a rotor imbalance, command pitch to power at large windspeeds to create overspeed events, inject a collective pitch command in phase to tower oscillations, etc. An adversary may also eliminate generator torque 120 to cause overspeed conditions or deactivate train-drive damping to cause system fatigue. In connection with accelerometers 130, an adversary might inject large tower top accelerations to trigger forced shutdown and/or wear out brakes, inject low tower acceleration to hide large structural loads, etc. With respect to a control system 140, an adversary might a limit pitch rate to promote instabilities in high shear environments, adjust a yaw set point to reduce energy capture, deactivate protection logic, etc. The control system 140 may be particularly susceptible to "mode switching attacks." For example, the turbine 100 may operate in various system "modes" (e.g., based on system performance and environmental factors in the turbine 100 the control modes might be associated with normal power production above rated, normal power production below rated, curtailment modes, shutdown modes, park mode, startup mode, etc.) and an adversary may attempt to falsely change the mode of operation of the cyber-physical system. By ways of examples only, an adversary might activate an aggressive pitch control mode to accelerate bearing weary, active a shutdown mode to disrupt energy delivery, activate a curtailment mode to reduce energy capture, etc.

Figure 2A:
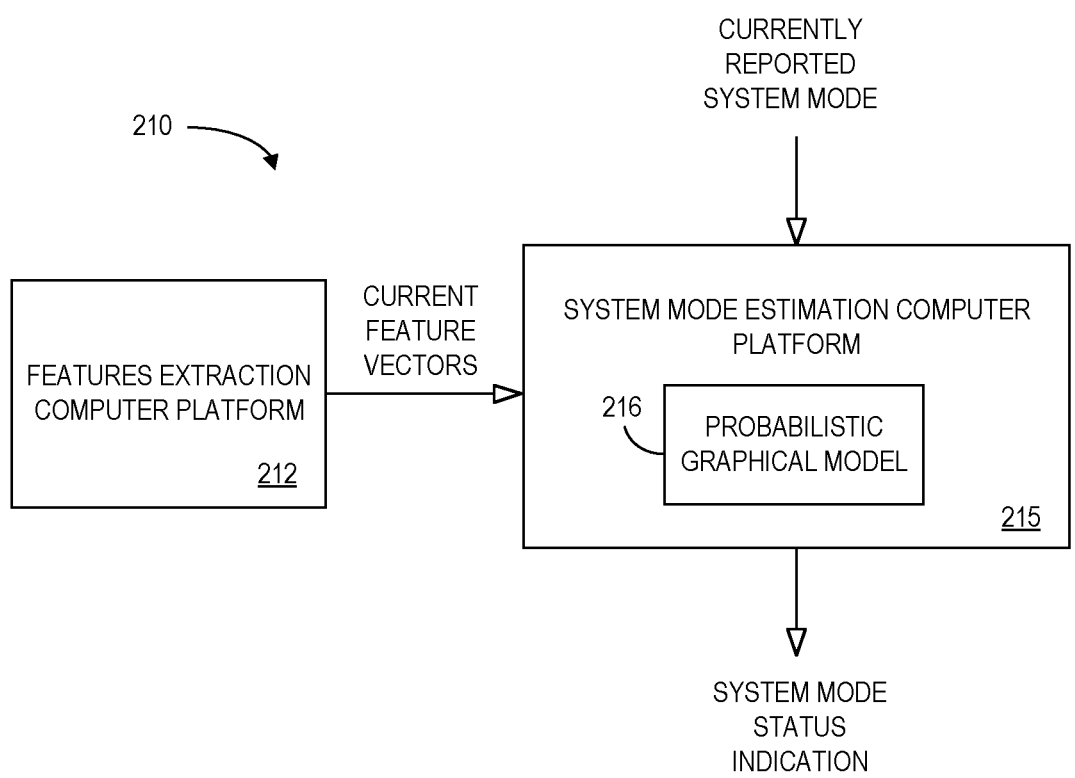
FIG. 2A is a high-level block diagram of a system that may be provided in accordance with some embodiments.

To help detect and/or prevent such mode switching attacks, FIG. 2A is a high-level block diagram of a system 210 that may be provided in accordance with some embodiments. Although an adversary may falsely change the controller mode of operation by hacking into the system, in a mode switching attack, the physical signatures and the environmental perception associated with particular modes, remain intact. Therefore, these measurements/estimations can provide a solid framework to determine the true expected mode of the system in which the controller must operate. For example, in a wind turbine, the turbine rotor speed, structural vibration measurements and wind speed estimate can be used for this goal. A features extraction computer platform 212 may extract current feature vectors based on monitoring node values (e.g., from sensors, actuators, or controllers) and transmit those vectors to a system mode estimation computer platform 215. As described with respect to FIGS. 3 through 14, the system 210 may also create global and local data-driven feature vector decision boundaries that can then be used to classify operation as "normal," "abnormal," etc. The system 210 may include a data-driven features extraction computer platform that receives information from the monitoring nodes and generates data-driven features. The system mode estimation computer platform 215 may then use a probabilistic graphical model 260 to generate an estimated system mode based on the feature vectors. The estimated system mode may be compared to a currently reported system mode (e.g., as reported by the cyber-physical system itself) and the result of that comparison can be used to generate a system mode status indication (e.g., which might then result in a mode override).

Figure 2B:
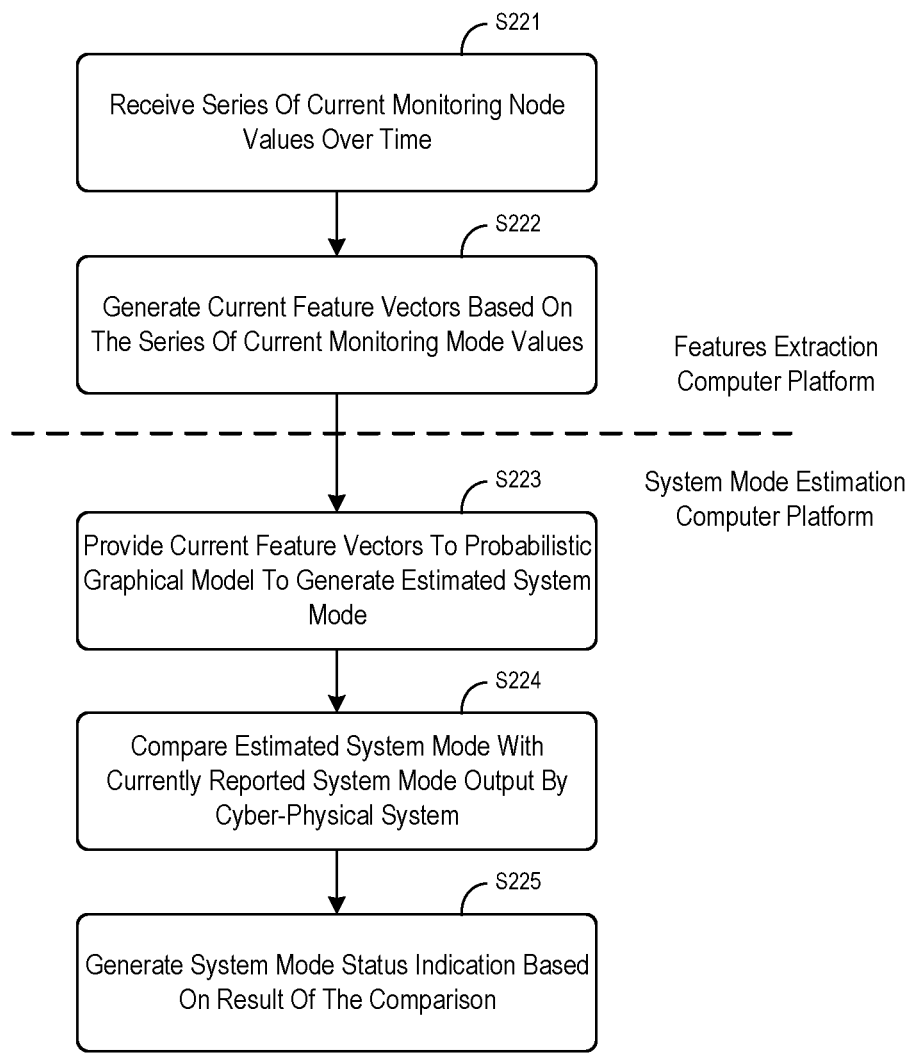
FIG. 2B is a method that may be provided in accordance with some embodiments.

FIG. 2B is a method that may be provided in accordance with some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S221, a features extraction computer platform may receive a series of current monitoring node values over time. At S222, the features extraction computer platform may generate current feature vectors based on the series of current monitoring mode values. At S223, a system mode estimation computer platform may provide the current feature vectors to a "probabilistic graphical model" to generate an estimated system mode. As used herein, the phrase "probabilistic graphical model" may refer to, for example, a model that uses a graph-based representation as the foundation for encoding a distribution over a multi-dimensional space and a graph that is a compact or factorized representation of a set of independences that hold in the specific distribution. The probabilistic graphical model might be associated with, for example, a Hidden Markov Model ("HMM"), a Hidden Semi-Markov Model ("HSMM"), a Conditional Random Fields ("CRF") model, a Bayesian network, etc.

Figure 2C:
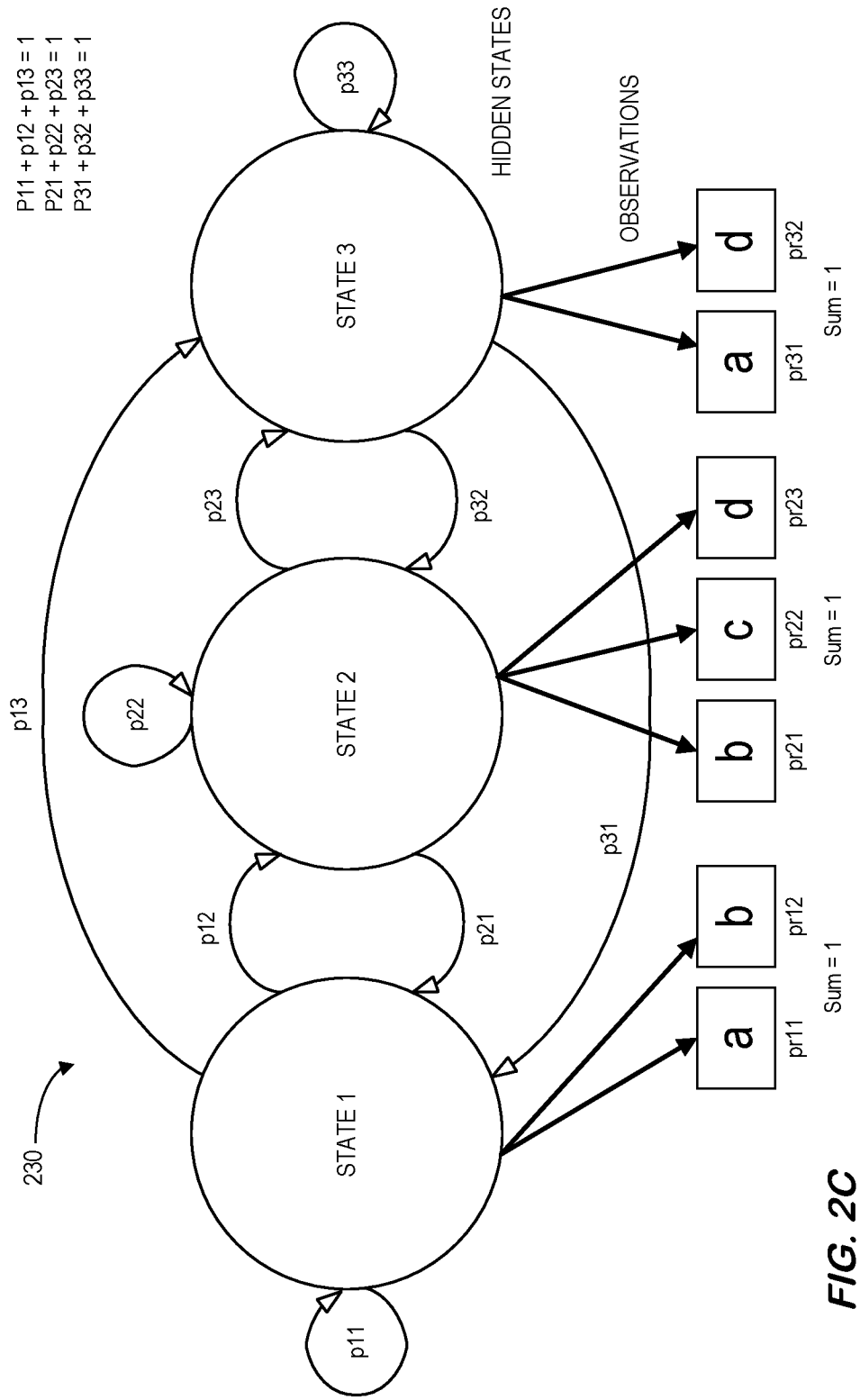
FIG. 2C illustrates a hidden Markov model for true mode estimation according to some embodiments.

FIG. 2C illustrates a MINI 230 for true mode estimation according to some embodiments. The MINI 230 may provide a framework for learning and representing joint (multivariate) probability distributions. In a probabilistic model, a graph expresses the conditional dependence structure between random variables. The MINI 230 provides a strong mathematical framework to estimate the system mode of operation from the available measurements. In the MINI 230, the states of the system are hidden (i.e., unknown), while the state emissions are available through observations. Given the observations, the MINI 230 gives the state that is most likely to produce the observed emissions. A controller mode estimator may be formed using the MINI such the controller modes are the hidden states and the monitoring nodes (the selected combination of sensors, actuators, and control parameters used for attack detection and accommodation), are the observed emissions.

In addition to the raw measurements form the monitoring nodes, extracted features from the time series data for each monitoring node may also be used as the MINI 230 emissions. The term "feature" may refer to, for example, mathematical characterizations of data. As described in connection with FIGS. 3 through 14, examples of features as applied to data might include the statistical features, such as maximum and minimum, mean, standard deviation, variance, and higher order statistics, settling time, Fast Fourier Transform ("FFT") spectral components, linear and non-linear principal components, independent components, sparse coding, deep learning, etc. The structural natural frequencies can also be considered as features. For example, in a wind turbine this may include, tower natural frequencies (first and second harmonic frequencies of the tower fore-aft and side-to-side oscillations) and blade natural frequencies (first and second harmonic frequencies of the blade flap-wise, edge-wise and torsional oscillations). The natural frequencies may be computed through spectral analysis methods such as FFT or Eigensystem Realization Algorithm ("ERA").

Referring again to FIG. 2B, at S224 the system mode estimation computer platform may compare the estimated system mode with a currently reported system mode output by the cyber-physical system. The system mode estimation computer platform may then generate a system mode status indication based on a result of said comparison at S225. The system mode status indication may be used, according to some embodiments, to override the currently reported system mode of the cyber-physical system (and thus protect the operation of the cyber-physical system).

Figure 2D:
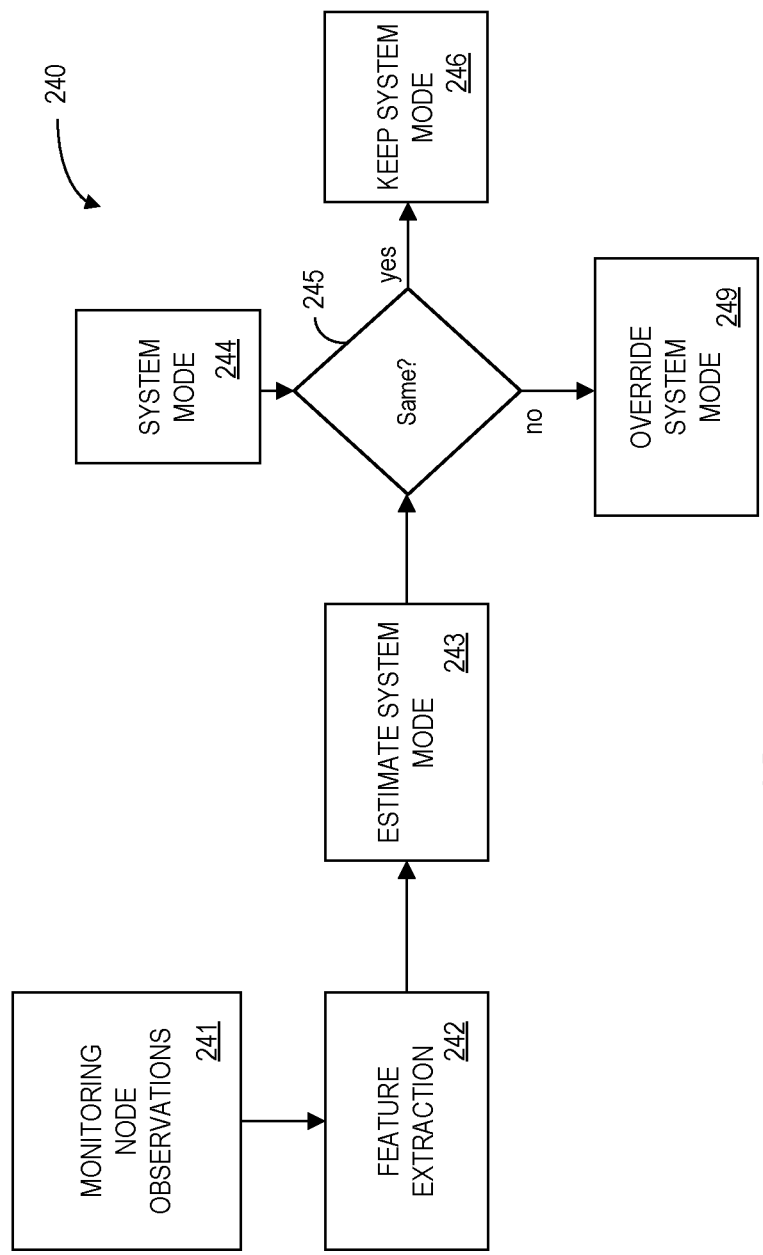
FIG. 2D is a mode switching attack detection and protection system in accordance with some embodiments.

FIG. 2D is a mode switching attack detection and protection system 240 in accordance with some embodiments. In particular, monitoring node observations 241 are provided to a feature extraction unit 242. The feature extraction unit 242 may output feature vectors to let the system 240 estimate the system mode 243. The estimated system mode 243 is compared to the reported system mode 244 and, if the results are the same at 245, no further action needs to be taken 246 (and the current system mode remains). If the results are not the same at 245, there is a "mis-match" and the system 240 may decide to override the system mode 249 with the estimated system mode 243 (as being more appropriate).

Figure 3:
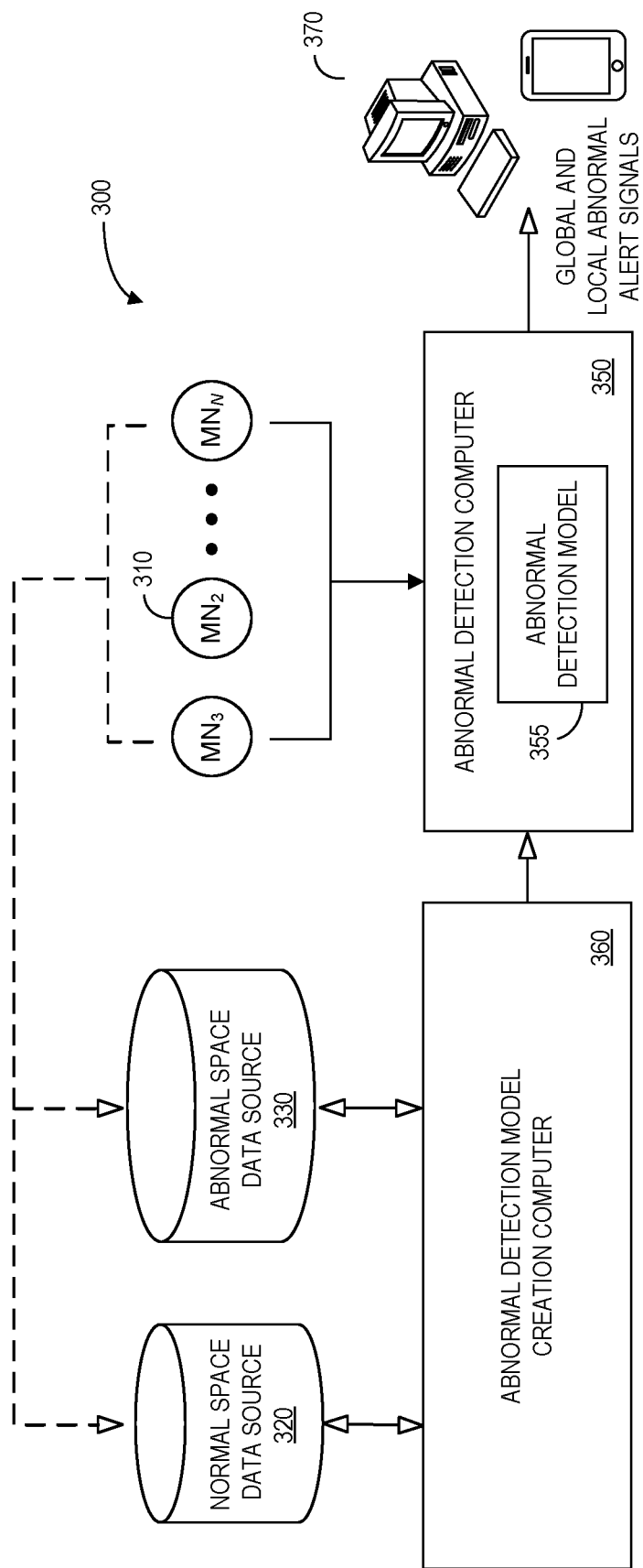
FIG. 3 is a high-level block diagram of a system that may be provided in accordance with some embodiments.

A description of how features may be incorporated in a data-driven abnormality detection system will now be provided. FIG. 3 is a high-level architecture of a data-driven features system 300 in accordance with some embodiments. The system 300 may include monitoring node sensors 310 $MN_1$ through $MN_N$, a "normal space" data source 320, and an "abnormal space" data source 330. The normal space data source 320 might store, for each of the plurality of monitoring nodes 310, a series of normal values over time that represent normal operation of a cyber-physical system (e.g., generated by a model or collected from actual sensor data as illustrated by the dashed line in FIG. 3). The abnormal space data source 330 might store, for each of the monitoring nodes 310, a series of abnormal values that represent abnormal operation of the cyber-physical system (e.g., when the system is experiencing a cyber-attack or a fault).

Information from the normal space data source 320 and the abnormal space data source 330 may be provided to an abnormal detection model creation computer 360 that uses this data to create a decision boundary (that is, a boundary that separates normal behavior from threatened behavior). The decision boundary may then be used by an abnormal detection computer 350 executing an abnormal detection model 355. The abnormal detection model 355 may, for example, monitor streams of data from the monitoring nodes 310 comprising data from sensor nodes, actuator nodes, and/or any other critical monitoring nodes (e.g., sensor nodes $MN_1$ through $MN_N$) and automatically output global and local abnormal alert signal to one or more remote monitoring devices 370 when appropriate (e.g., for display to an operator or to have the global and local information fused in accordance with any of the embodiments described herein). According to some embodiments, information about detected threats may be transmitted back to a cyber-physical system control system. Note that, according to some embodiments, the abnormal detection computer 350 may implement a hybrid approach that also incorporates mode estimation when making an abnormality classification (e.g., as described with respect to FIGS. 22 and 23).

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The abnormal detection model creation computer 360 may store information into and/or retrieve information from various data stores, such as the normal space data source 320 and/or the abnormal space data source 330. The various data sources may be locally stored or reside remote from the abnormal detection model creation computer 360. Although a single abnormal detection model creation computer 360 is shown in FIG. 3, any number of such devices may be included. Moreover, various devices described herein might be combined according to embodiments of the present invention. For example, in some embodiments, the abnormal detection model creation computer 360 and one or more data sources 320, 330 might comprise a single apparatus. The abnormal detection model creation computer 360 functions may be performed by a constellation of networked apparatuses, in a distributed processing or cloud-based architecture.

A user may access the system 300 via one of the monitoring devices 370 (e.g., a Personal Computer ("PC"), tablet, or smartphone) to view information about and/or manage threat information in accordance with any of the embodiments described herein. In some cases, an interactive graphical display interface may let a user define and/or adjust certain parameters (e.g., abnormal detection trigger levels) and/or provide or receive automatically generated recommendations or results from the abnormal detection model creation computer 360 and/or abnormal detection computer 350.

Thus. some embodiments described herein may use time series data from one or more monitoring nodes 310 from a physical (i.e., industrial or enterprise) asset and provide a reliable abnormality detection with low false positive rate. The system may extract features from the time series data for each monitoring node. The term "feature" may refer to, for example, mathematical characterizations of data. Examples of features as applied to data might include the maximum and minimum, mean, standard deviation, variance, settling time, FFT spectral components, linear and non-linear principal components, independent components, sparse coding, deep learning, etc. The type and number of features for each monitoring node might be optimized using domain-knowledge and/or a feature discovery process. The features may be, for example, calculated over a sliding window with consecutive samples of specified duration from time series data. The length of the window and the duration of overlap for each batch may be determined from domain knowledge and an inspection of the data or using batch processing. Note that features may be computed at the local level (associated with each monitoring node) and the global level (associated with all the monitoring nodes, i.e., the whole asset). The time-domain values of the nodes or their extracted features may be, according to some embodiments, normalized for better numerical conditioning.

Figure 4:
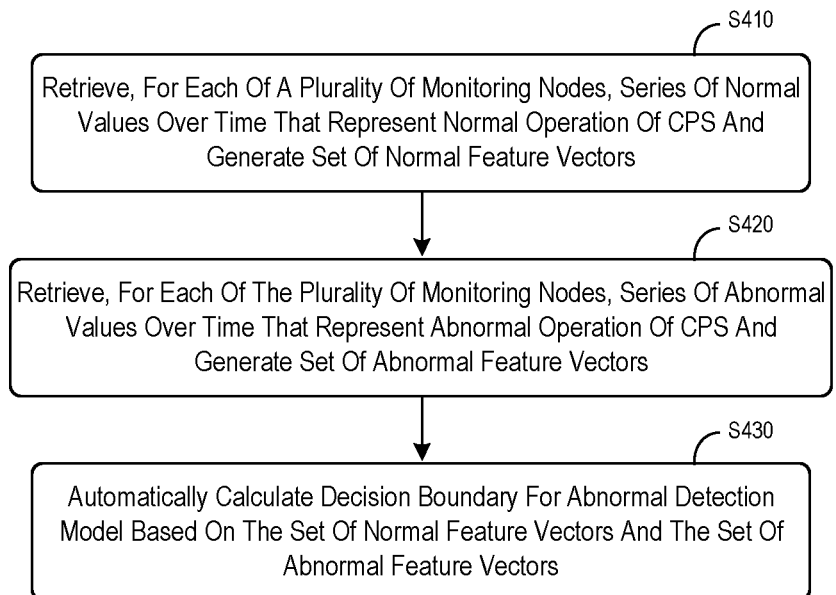
FIG. 4 is a model creation method according to some embodiments.

FIG. 4 illustrates a model creation method that might be performed by some or all of the elements of the system 300 described with respect to FIG. 3. At S410, the system may retrieve, for each of a plurality of monitoring nodes (e.g., sensor nodes, ac, controller nodes, etc.), a series of normal values over time that represent normal operation of the Cyber-Physical System ("CPS") and a set of normal data-driven feature vectors may be generated. Similarly, at S420 the system may retrieve, for each of the plurality of monitoring nodes, a series of abnormal (e.g., attacked) values over time that represent an abnormal operation of the cyber-physical system and a set of abnormal data-driven feature vectors may be generated. The series of normal and/or abnormal values might be obtained, for example, by running Design of Experiments ("DoE") on a cyber-physical system. At S430, a decision boundary may be automatically calculated for an abnormal detection model based on the set of normal feature vectors and the set of abnormal feature vectors. According to some embodiments, the decision boundary might be associated with a line, a hyperplane, a non-linear boundary separating normal space from threatened space, and/or a plurality of decision boundaries. Moreover, a decision boundary might comprise a multi-class decision boundary separating normal space, attacked space, and degraded operation space (e.g., when a sensor fault occurs). In addition, note that the abnormal detection model might be associated with the decision boundary, feature mapping functions, and/or feature parameters.

Figure 5:
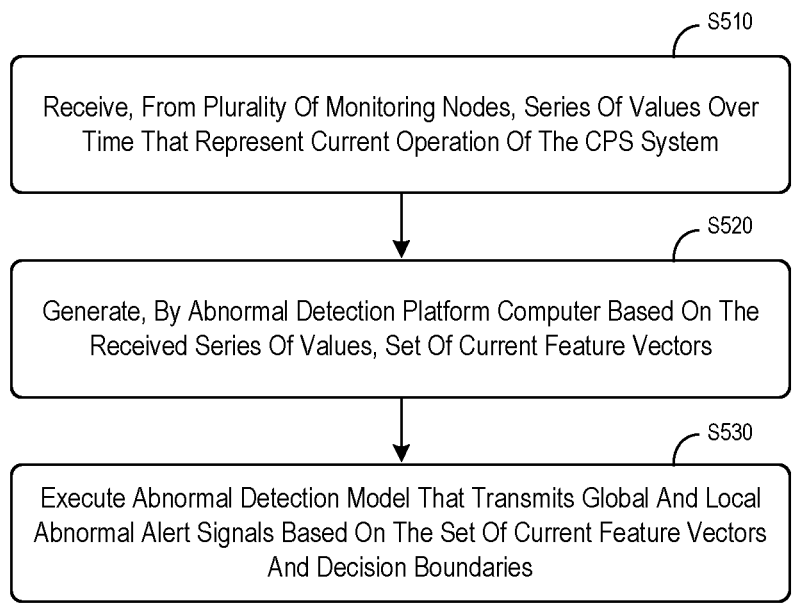
FIG. 5 is an abnormal alert method according to some embodiments.

The decision boundary can then be used to detect abnormal operation (e.g., as might occur during cyber-attacks). For example, FIG. 5 is an abnormal alert method according to some embodiments. At S510, the system may receive, from a plurality of monitoring nodes, a series of current values over time that represent a current operation of the cyber-physical system. At S520, an attack detection platform computer may then generate, based on the received series of current values, a set of current data-driven feature vectors. At S530, an abnormal detection model may be executed to transmit an abnormal alert signal based on the set of current feature vectors and a decision boundary when appropriate (e.g., when a cyber-attack or fault is detected). According to some embodiments, one or more response actions may be performed when an abnormal alert signal is transmitted. For example, the system might automatically shut down all or a portion of the cyber-physical system (e.g., to let the detected potential cyber-attack be further investigated). As other examples, one or more parameters might be automatically modified, a software application might be automatically triggered to capture data and/or isolate possible causes, etc.

Some embodiments described herein may take advantage of the physics of a control system by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the control system may be monitored in substantially real-time. Abnormalities may be detected by classifying the monitored data as being "normal" or disrupted (or degraded). This decision boundary may be constructed using dynamic models and may help enable early detection of vulnerabilities (and potentially avert catastrophic failures) allowing an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines or machine learning techniques) may be used to generate decision boundaries. Since boundaries may be driven by measured data (or data generated from high-fidelity models), defined boundary margins may help to create an abnormal zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account on operator's knowledge about system operation (e.g., the differences between normal and abnormal operation).

Figure 6:
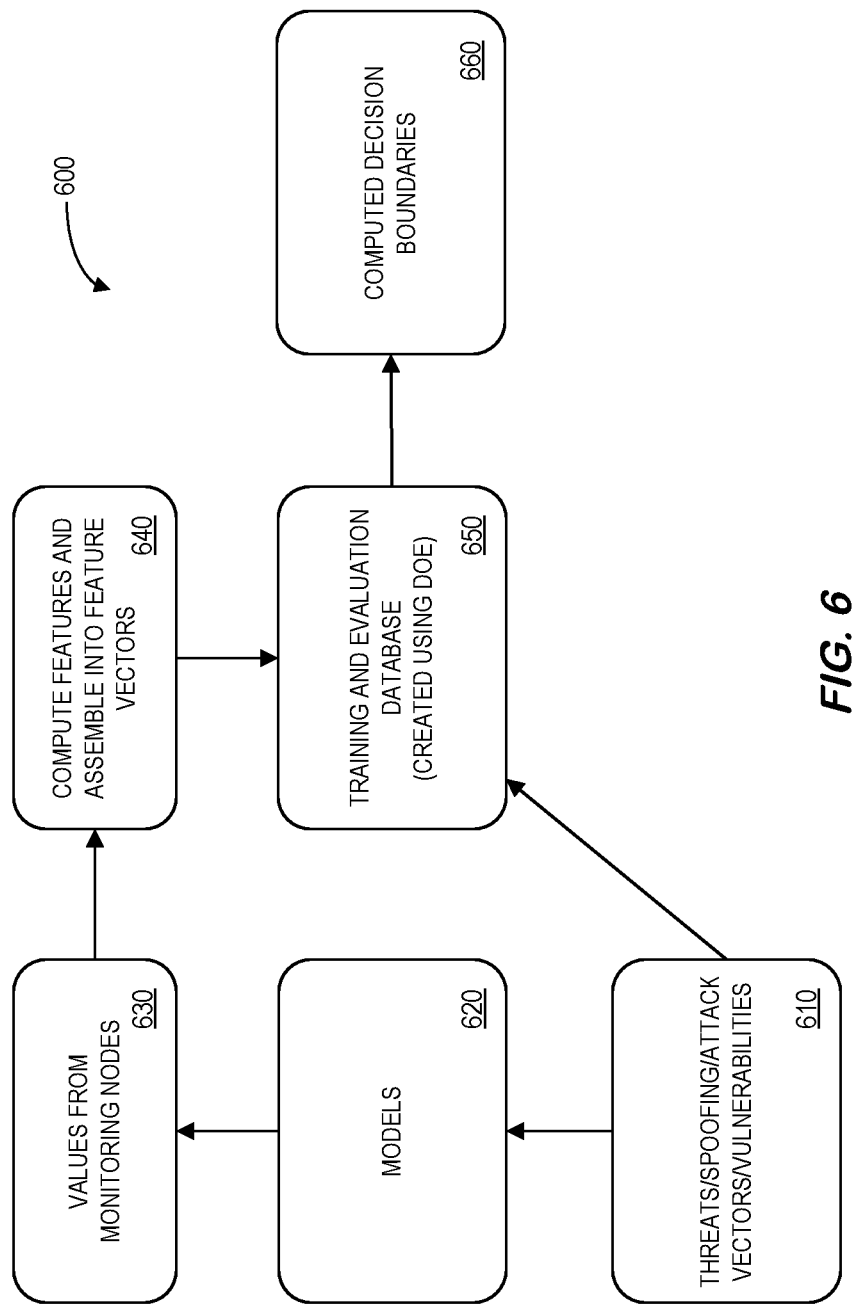
FIG. 6 illustrates an off-line process in accordance with some embodiments.

FIG. 6 illustrates an off-line boundary creation process 600 in accordance with some embodiments. Information about threats, spoofing, attack vectors, vulnerabilities, etc. 610 may be provided to models 620 and/or a training and evaluation database 650 created using DoE techniques. The models 620 may, for example, simulate data 630 from monitoring nodes to be used to compute features that are assembled into a feature vector 640 to be stored in the training and evaluation database 650. The data in the training and evaluation database 650 may then be used to compute decision boundaries 660 to distinguish between normal operation and abnormal operation. According to some embodiments, the process 600 may include a prioritization of monitoring nodes and anticipated attack vectors to form one or more data sets to develop decision boundaries. Attack vectors are abnormal values at critical inputs where malicious attacks can be created at the domain level that will make the system go into threatened/abnormal space. In addition, the models 620 may comprise high-fidelity models that can be used to create a data set (e.g., a set that describes threat space as "levels of threat conditions in the system versus quantities from the monitoring nodes"). The data 630 from the monitoring nodes might be, for example, quantities that are captured for a length of from 60 to 80 seconds from sensor nodes, actuator nodes, and/or controller nodes (and a similar data set may be obtained for "levels of normal operating conditions in the system versus quantities from the monitoring nodes"). This process will result in data sets for "abnormal space" and "normal space." The 60 to 80 seconds long quantities may be used to compute features 640 using feature engineering to create feature vectors. These feature vectors can then be used to obtain a decision boundary that separates the data sets for abnormal space and normal space (used to detect an anomaly such as a cyber-attack or naturally occurring fault).

Since attacks might be multi-prong (e.g., multiple attacks might happen at once), DoE experiments may be designed to capture the attack space (e.g., using full factorial, Taguchi screening, central composite, and/or Box-Behnken). When models are not available, these DoE methods can also be used to collect data from real-world asset control system. Experiments may run, for example, using different combinations of simultaneous attacks. Similar experiments may be run to create a data set for the normal operating space. According to some embodiments, the system may detect "degraded" or faulty operation as opposed to a threat or attack. Such decisions may require the use of a data set for a degraded and/or faulty operating space.

Figure 7:
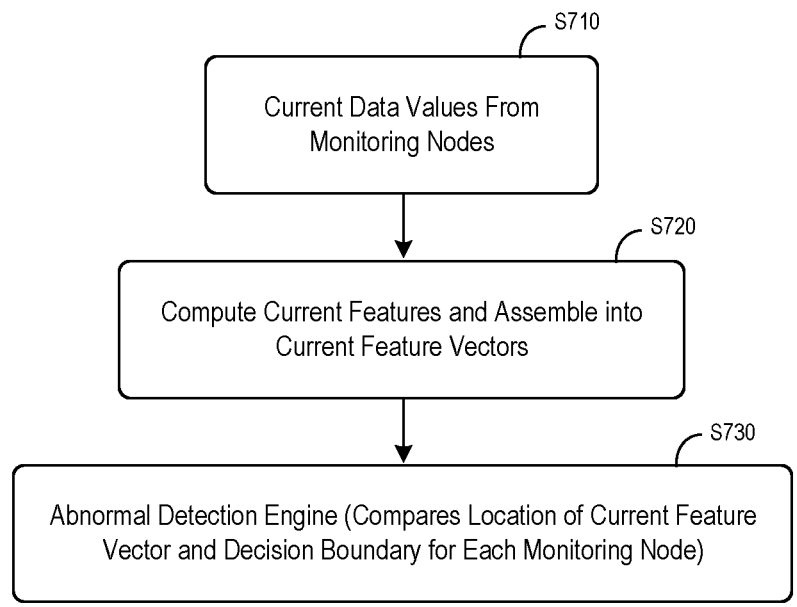
FIG. 7 illustrates a real-time process according to some embodiments.

FIG. 7 illustrates a real-time process to protect a cyber-physical system according to some embodiments. At S710, current data from monitoring nodes may be gathered (e.g., in batches of from 60 to 80 seconds). At S720, the system may compute features and form data-driven feature vectors. For example, the system might use weights from a principal component analysis as features. At S730, an abnormal detection engine may compare location of feature vectors to a decision boundary to make a determination (and output an abnormal signal if necessary). According to some embodiments, monitoring node data from models (or from real systems) may be expressed in terms of features since features are a high-level representation of domain knowledge and can be intuitively explained. Moreover, embodiments may handle multiple features represented as vectors and interactions between multiple sensed quantities might be expressed in terms of "interaction features."

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Figure 8:
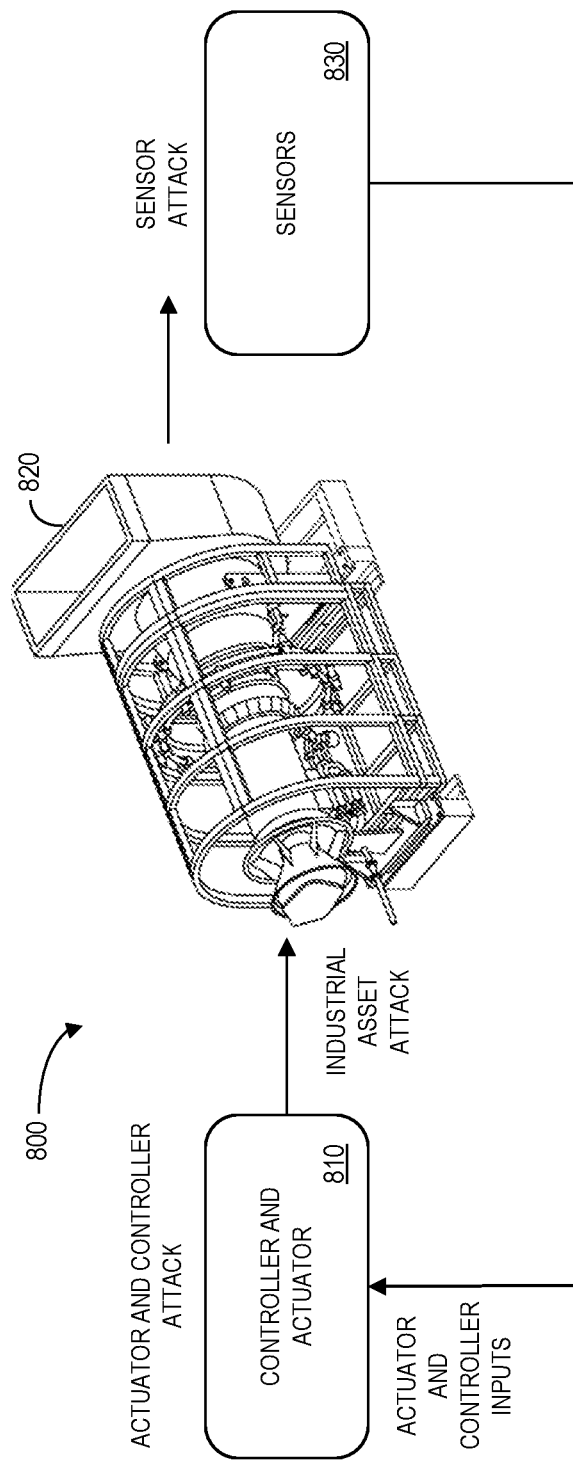
FIG. 8 is an example associated with a cyber-physical system engine in accordance with some embodiments.

FIG. 8 is an example 800 associated with a cyber-physical system in accordance with some embodiments. In particular, the example includes a controller and actuator portion 810 subject to actuator and controller attacks, a gas turbine portion 820 subject to state attacks, and sensors 830 subject to sensor attacks. By way of examples only, the sensors 830 might comprise physical and/or virtual sensors associated with temperatures, airflows, power levels, etc. The actuators might be associated with, for example, motors. By monitoring the information in the cyber-physical system, a threat detection platform may be able to detect cyber-attacks (e.g., using data-driven feature vectors and a decision boundary) that could potentially cause a large amount of damage.

Figure 9:
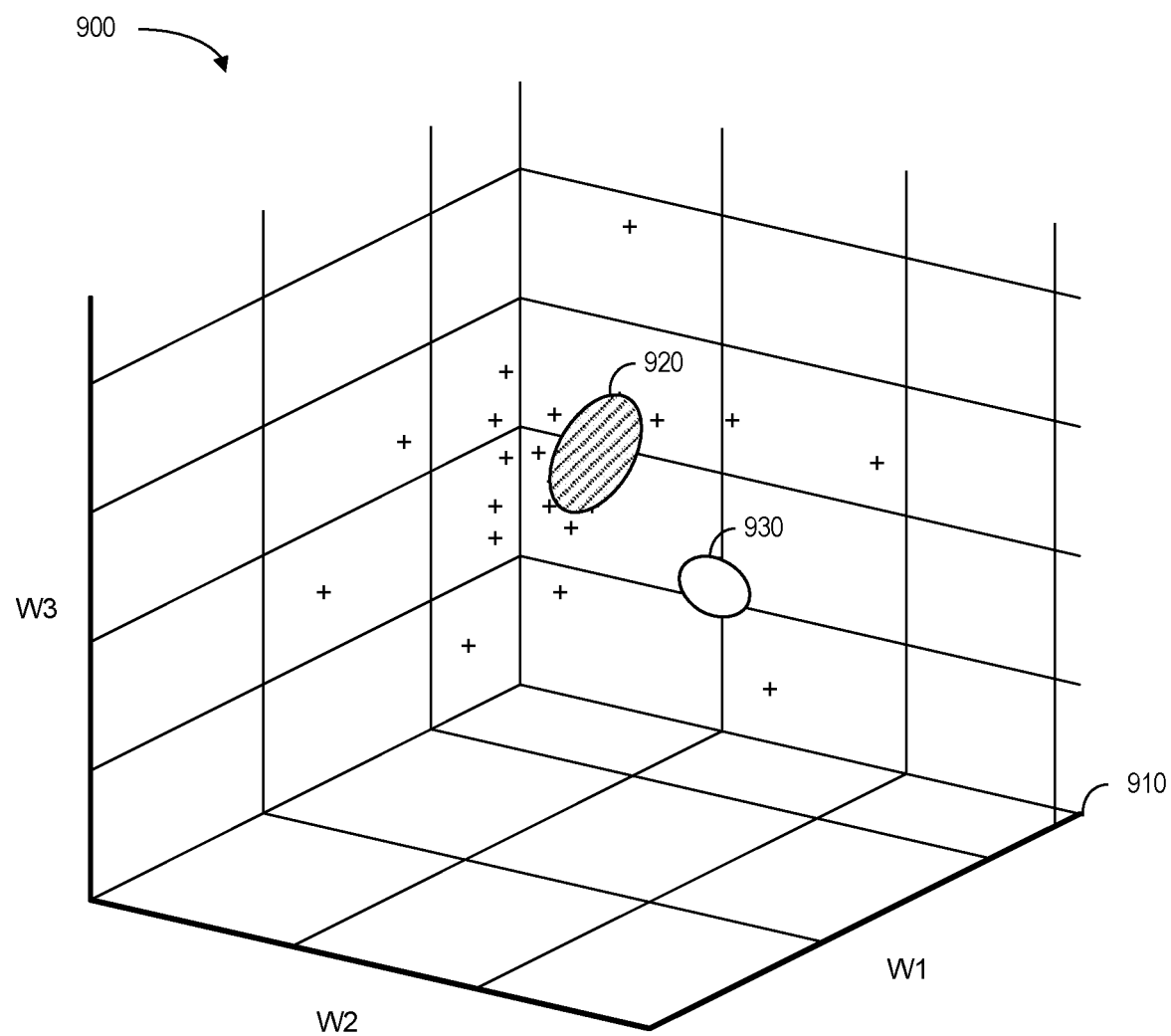
FIG. 9 illustrates three dimensions of sensor outputs in accordance with some embodiments.
Figure 10:
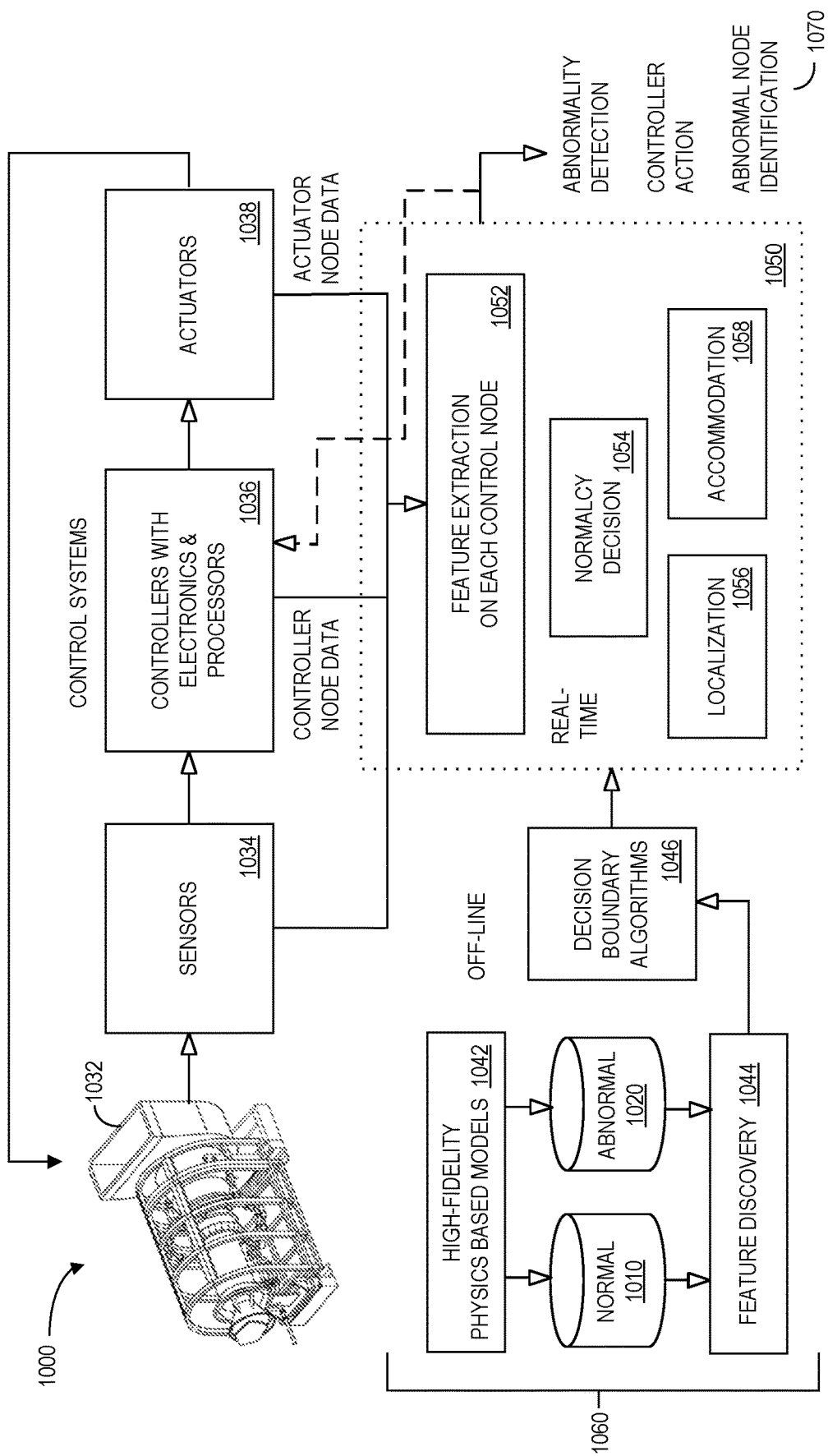
FIG. 10 is an abnormal alert system according to some embodiments.

FIG. 9 illustrates 900 three dimensions of monitoring node outputs in accordance with some embodiments. In particular, a graph 910 plots monitoring node outputs ("+") in three dimensions, such as dimensions associated with Principal Component Features ("PCF"): w1, w2, and w3. Moreover, the graph 910 includes an indication of a normal operating space decision boundary 920 that might be appropriate depending on the mode of system operation. Although a single contiguous boundary 920 is illustrated in FIG. 9, embodiments might be associated with multiple regions. The graph 910 further includes a normal operating space decision boundary 930 that might be appropriate when the system is operating in a different mode. Note that PCF information may be represented as weights in reduced dimensions. For example, data from each monitoring node may be converted to low dimensional features (e.g., weights). According to some embodiments, monitoring node data is normalized as follows:

$$S_{normalized}(k) = \frac{S_{nominal}(k) - S_{original}(k)}{\overline{S}_{nominal}}$$

where S stands for a monitoring node quantity at "k" instant of time. Moreover, output may then be expressed as a weighted linear combination of basis functions as follows:

$$S = S_0 + \sum_{j=1}^{N} w_i \Psi_j$$

where $S_0$ is the average monitoring node output with all threats, $w_j$ is the $j^{th}$ weight, and $\Psi_j$ is the $j^{th}$ basis vector. According to some embodiments, natural basis vectors are obtained using a covariance of the monitoring nodes' data matrix. Once the basis vectors are known, weight may be found using the following equation (assuming that the basis sets are orthogonal):

$$w_j = (S - S_0)^T \Psi_j$$

Note that weights may be an example of features used in a feature vector.

Thus, embodiments may enable the passive detection of indications of multi-class abnormal operations using real-time signals from monitoring nodes. Moreover, the detection framework may allow for the development of tools that facilitate proliferation of the invention to various systems (e.g., turbines) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to cyber-physical system operators so that an attack may be thwarted (or the effects of the attack may be blunted), reducing damage to equipment.

According to some embodiments, a system may further localize an origin of a threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in a threat alert signal.

Some embodiments of the algorithm may utilize feature-based learning techniques based on high-fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple attacks on control signals, and rationalize where the root cause attack originated. For example, the algorithm may decide if a signal is anomalous because of a previous signal attack, or if it is instead independently under attack. This may be accomplished, for example, by monitoring the evolution of the features as well as by accounting for time delays between attacks.

A cyber-attack detection and localization algorithm may process a real-time cyber-physical system signal data stream and then compute features (multiple identifiers) which can then be compared to the signal-specific decision boundary. A block diagram of a system 1000 utilizing a signal-specific cyber-physical system abnormality detection and localization algorithm according to some embodiments is provided in FIG. 10. In particular, a gas turbine 1032 provides information to sensors 1034 which helps controllers with electronics and processors 1036 adjust actuators 1038. A threat detection system 1060 may include one or more high-fidelity physics-based models 1042 associated with the turbine 1032 to create normal data 1010 and/or abnormal data 1020. The normal data 1010 and abnormal data 1020 may be accessed by a feature discovery component 1044 and processed by decision boundary algorithms 1046 while off-line (e.g., not necessarily while the gas turbine 1032 is operating). The decision boundary algorithms 1046 may generate an abnormal model including decision boundaries for various monitoring nodes. Each decision boundary may separate two data sets in a high dimensional space which is constructed by running a binary classification algorithm, such as a support vector machine using the normal data 1010 and abnormal data 1020 for each monitoring node signal (e.g., from the sensors 1034, controllers 1036, and/or the actuators 1038).

A real-time threat detection platform 1050 may receive the boundaries along with streams of data from the monitoring nodes. The platform 1050 may include a feature extraction on each monitoring node element 1052 and a normalcy decision 1054 with an algorithm to detect attacks in individual signals using signal specific decision boundaries, as well rationalize attacks on multiple signals, to declare which signals were attacked (or are otherwise abnormal), and which became anomalous due to a previous attack on the system via a localization module 1056. An accommodation element 1058 may generate outputs 1070, such as an anomaly decision indication (e.g., an abnormal) alert signal, a controller action, and/or a list of abnormal monitoring nodes.

During real-time detection, contiguous batches of control signal data may be processed by the platform 1050, normalized and the feature vector extracted. The location of the vector for each signal in high-dimensional feature space may then be compared to a corresponding decision boundary. If it falls within the abnormal region, then a cyber-attack may be declared. The algorithm may then make a decision about where the attack originally occurred. An attack may sometimes be on the actuators 1038 and then manifested in the sensor 1034 data. Attack assessments might be performed in a post decision module (e.g., the localization element 1056) to isolate whether the attack is related to the sensor, controller, or actuator (e.g., indicating which part of the monitoring node). This may be done by individually monitoring, overtime, the location of the feature vector with respect to the hard decision boundary. For example, when a sensor 1034 is spoofed, the attacked sensor feature vector will cross the hard decision boundary earlier than the rest of the vectors as described with respect to FIGS. 11 through 13. If a sensor 1034 is declared to be anomalous, and a command to the auxiliary equipment is later determined to be anomalous, it may be determined that the original attack, such as signal spoofing, occurred on the sensor 1034. Conversely, if the signal to the auxiliary equipment was determined to be anomalous first, and then later manifested in the sensor 1034 feedback signal, it may be determined that the signal to the equipment was initially attacked.

According to some embodiments, it may be detected whether or not a signal is in the normal operating space (or abnormal space) through the use of localized decision boundaries and real-time computation of the specific signal features. Moreover, an algorithm may differentiate between a sensor being attacked as compared to a signal to auxiliary equipment being attacked. The control intermediary parameters and control logical(s) may also be analyzed using similar methods. Note that an algorithm may rationalize signals that become anomalous. An attack on a signal may then be identified.

Figure 11:
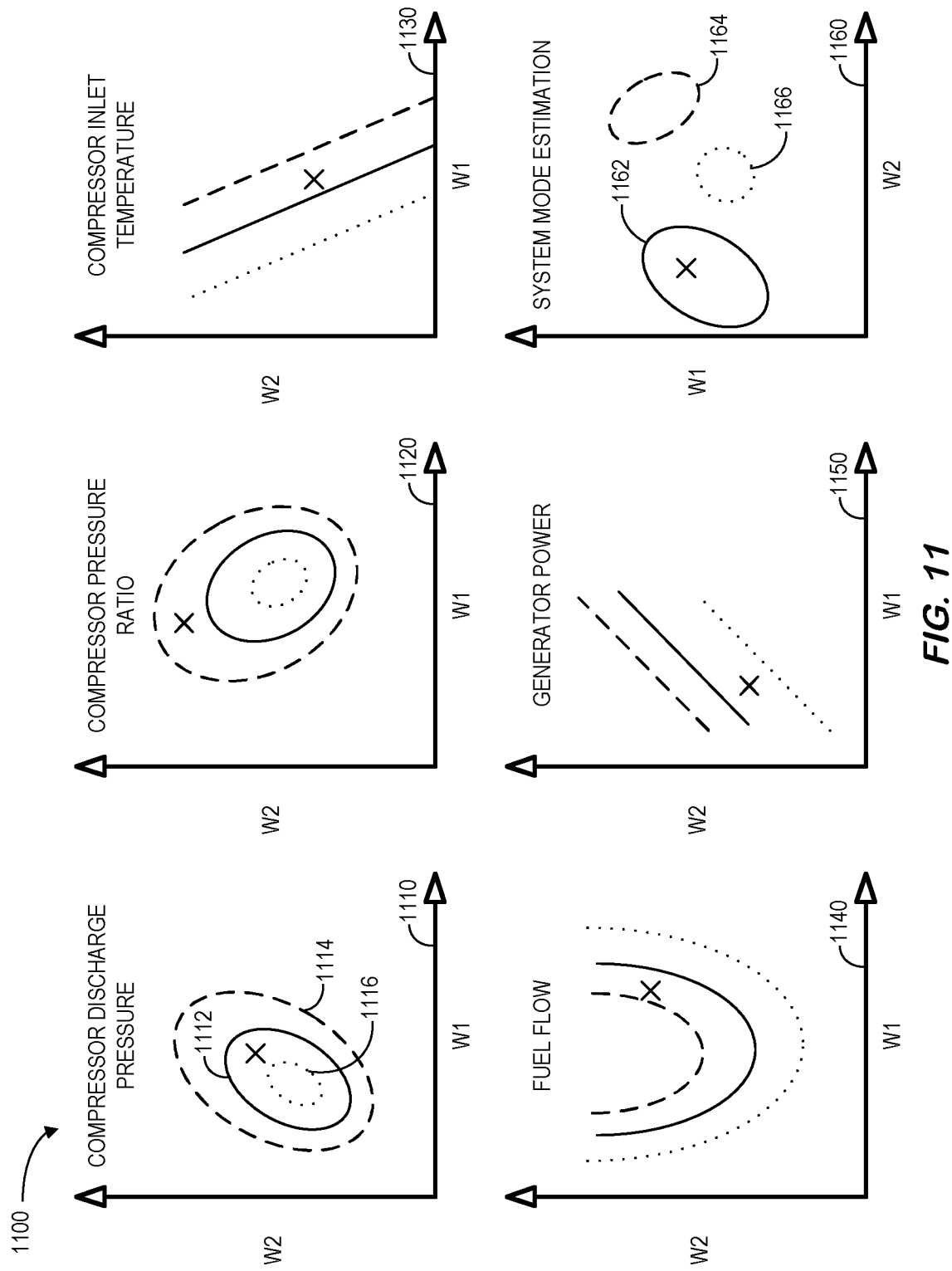
FIGS. 11 through 13 illustrate boundaries and locations of feature vectors for various parameters in accordance with some embodiments.

FIG. 11 illustrates 1100 boundaries and feature vectors for various monitoring node parameters in accordance with some embodiments. In particular, for each parameter a graph includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA might be one of the features that might be used by the algorithm to characterize the data, but note that other features could be leveraged.

A graph is provided for five data-driven features: compressor discharge temperature 1110, compressor pressure ratio 1120, compressor inlet temperature 1130, fuel flow 1140, and generator power 1150. Each graph includes a hard boundary 1112 (solid curve), inner boundary 1116 (dotted curve), and outer boundary 1114 (dashed curve) and an indication associated with current feature location for each monitoring node parameter (illustrated with an "X" on the graphs). As illustrated in FIG. 11, the current monitoring node location is between the minimum and maximum boundaries (that is, the "X" is between the dotted and dashed lines). As a result, the system may determine that the operation of the cyber-physical system control system is normal (and no threat is being detected indicating that the system is currently under attack or that a naturally occurring fault has occurred). FIG. 11 further includes a graph 1160 to illustrate feature space regions 1162, 1164, 1166 what might be appropriate for various modes of operation.

Figure 12:
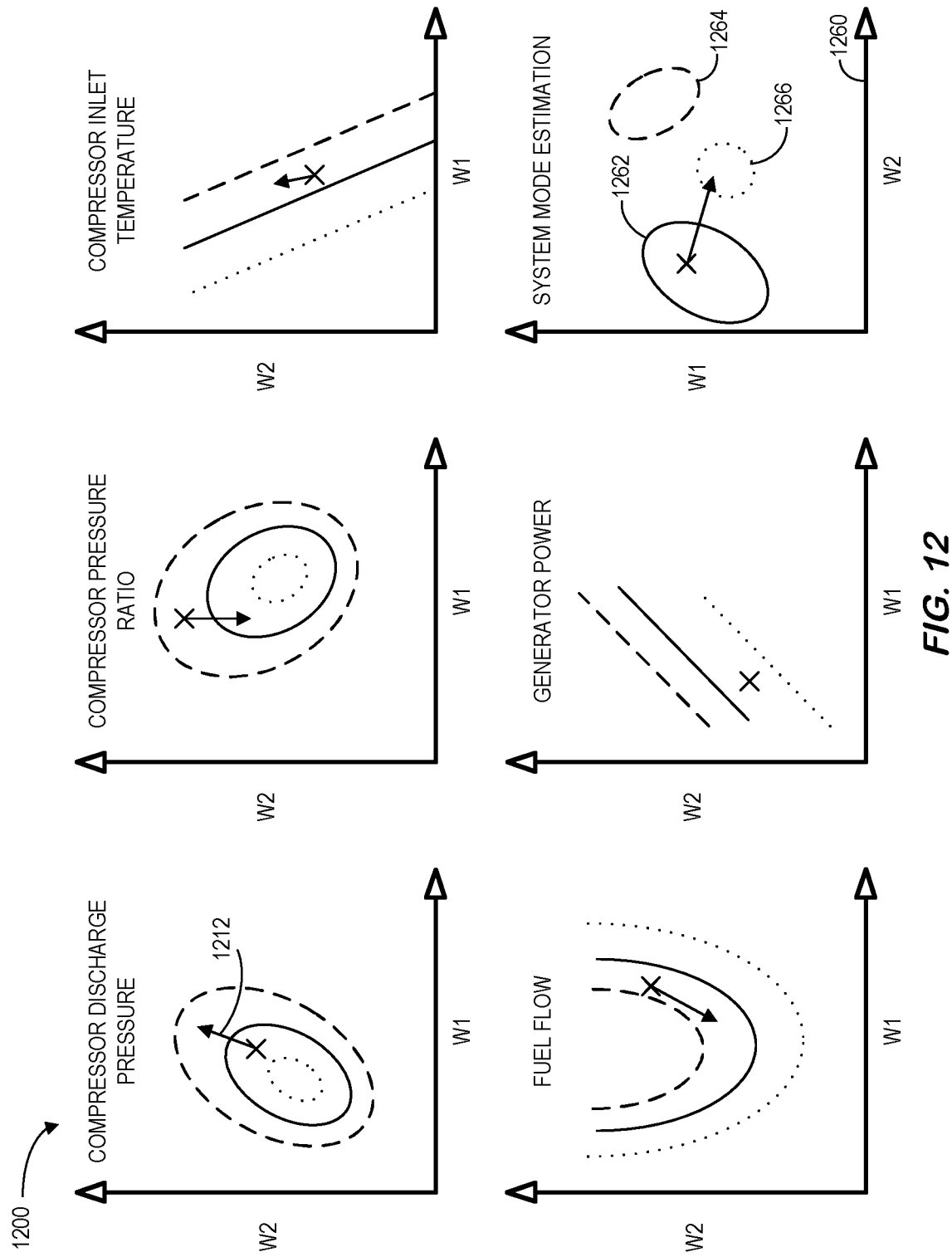

FIG. 12 illustrates 1200 subsequent boundaries and feature vectors for these parameters. Consider, for example, a feature vector movement 1212 for the compressor discharge pressure. Even though feature vector 1212 has moved, it is still within the maximum and minimum boundaries and, as a result, normal operation of that monitoring node may be determined. This is the case for the first five graphs in FIG. 12. In this example, the current feature value associated with system mode estimation 1260 has moved outside an associated threshold and, as a result, a potentially improper mode of operation may be determined. The result might that the system will override the current reported mode of operation with a different estimated mode.

Figure 13:
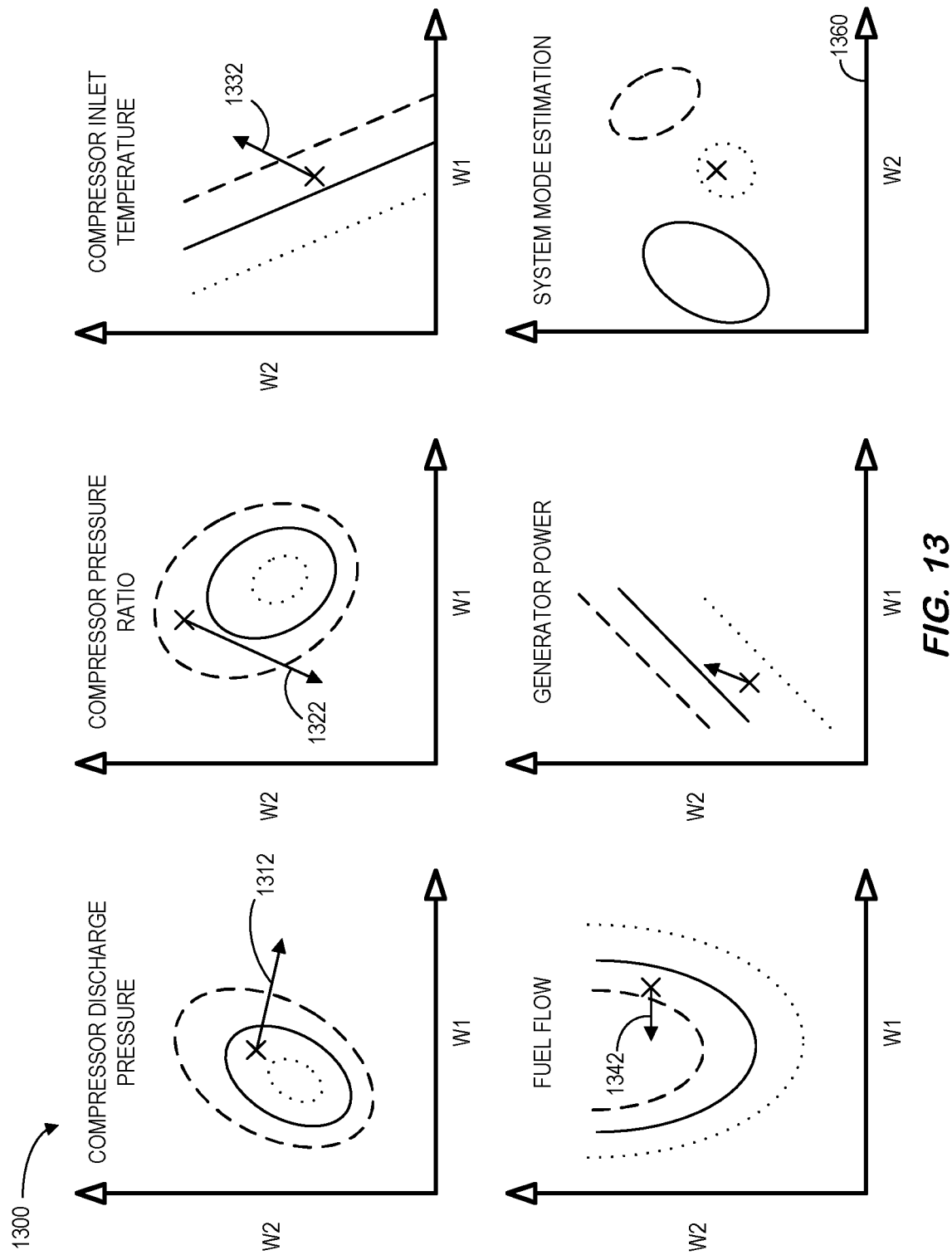

As illustrated 1300 in FIG. 13, an attack may have already been detected and now other signals are becoming abnormal. In particular, feature movement for the compressor discharge pressure 1312, compressor pressure ratio 1322, compressor inlet temperature 1332, and fuel flow 1342 have all become abnormal (joining the system mode estimation 1360). Note that the feature vector for generator power did not become abnormal. In order to decide whether or not these signals 1312, 1322, 1332, 1342 are truly currently under attack, a historical batch with pertinent feature vector information may be kept for some duration of time. Then when an attack is detected on another signal, this batch is examined, and the time at which the confirmed attack on gas turbine exhaust temperature as well as several subsequent elements is analyzed.

Note that one signal rationalization might be associated with a system time delay. That is, after a sensor is attacked there might be a period of time before the system returns to a steady state. After this delay, any signal that becomes anomalous might be due to an attack as opposed to the system responding.

The current methods for detecting abnormal conditions in monitoring nodes are limited to Fault Detection Isolation and Accommodation ("FDIA"), which itself is very limited. The hybrid cyber-attack detection and localization algorithms described herein can not only detect abnormal signals of sensors, but can also detect signals sent to auxiliary equipment, control intermediary parameters and/or control logical(s). The algorithms may also understand multiple signal attacks. One challenge with correctly identifying a cyber-attack threat is that it may occur with multiple sensors being impacted by malware. According to some embodiments, an algorithm may identify in real-time that an attack has occurred, which sensor(s) are impacted, and declare a fault response. To achieve such a result, the detailed physical response of the system must be known to create acceptable decision boundaries. This might be accomplished, for example, by constructing data sets for normal and abnormal regions by running DoE experiments on high-fidelity models. A data set for each sensor might comprise a feature vector for given threat values (e.g., temperature, airflow, etc.). Full factorial, Taguchi screening, central composite and Box-Behnken are some of the known design methodologies used to create the attack space. When models are not available, these DoE methods are also used to collect data from real-world cyber-physical systems. Experiments may be run at different combinations of simultaneous attacks. In some embodiments, the system may detect degraded/faulty operation as opposed to a cyber-attack. Such decisions might utilize a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Note that multiple vector properties might be examined, and the information described with respect to FIGS. 11 through 13 may be processed to determine if the signal had been trending in a specific direction as the attack was detected (or if it had just been moving due to noise). Had the signal been uniformly trending as the attack took place and afterward, then this signal is a response to the original attack and not an independent attack.

According to some embodiments, the system may localize or otherwise analyze an origin of the threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in the threat alert signal.

Some embodiments described herein may take advantage of the physics of a cyber-physical system by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the cyber-physical system may be monitored in substantially real-time. Abnormalities may be detected by classifying the monitored data as being "normal" or disrupted (or degraded). This decision boundary may be constructed using dynamic models and may help to enable early detection of vulnerabilities (and potentially avert catastrophic failures) allowing an operator to restore the cyber-physical system to normal operation in a timely fashion.

Thus, some embodiments may provide an advanced hybrid anomaly detection algorithm to detect cyber-attacks on, for example, key cyber-physical system control sensors. The algorithm may identify which signals(s) are being attacked using control signal-specific decision boundaries and may inform a cyber-physical system to take accommodative actions. In particular, a detection and localization algorithm might detect whether a sensor, auxiliary equipment input signal, control intermediary parameter, or control logical are in a normal or anomalous state. Some examples of cyber-physical system monitoring nodes that might be analyzed include: critical control sensors; control system intermediary parameters; auxiliary equipment input signals; and/or logical commands to controller.

A cyber-attack detection and localization algorithm may process a real-time cyber-physical system signal data stream and then compute features (multiple identifiers) which can then be compared to the sensor specific decision boundary. In some embodiments, generating features may involve simply performing an identity transform. That is, the original signal might be used as it is.

Figure 14:
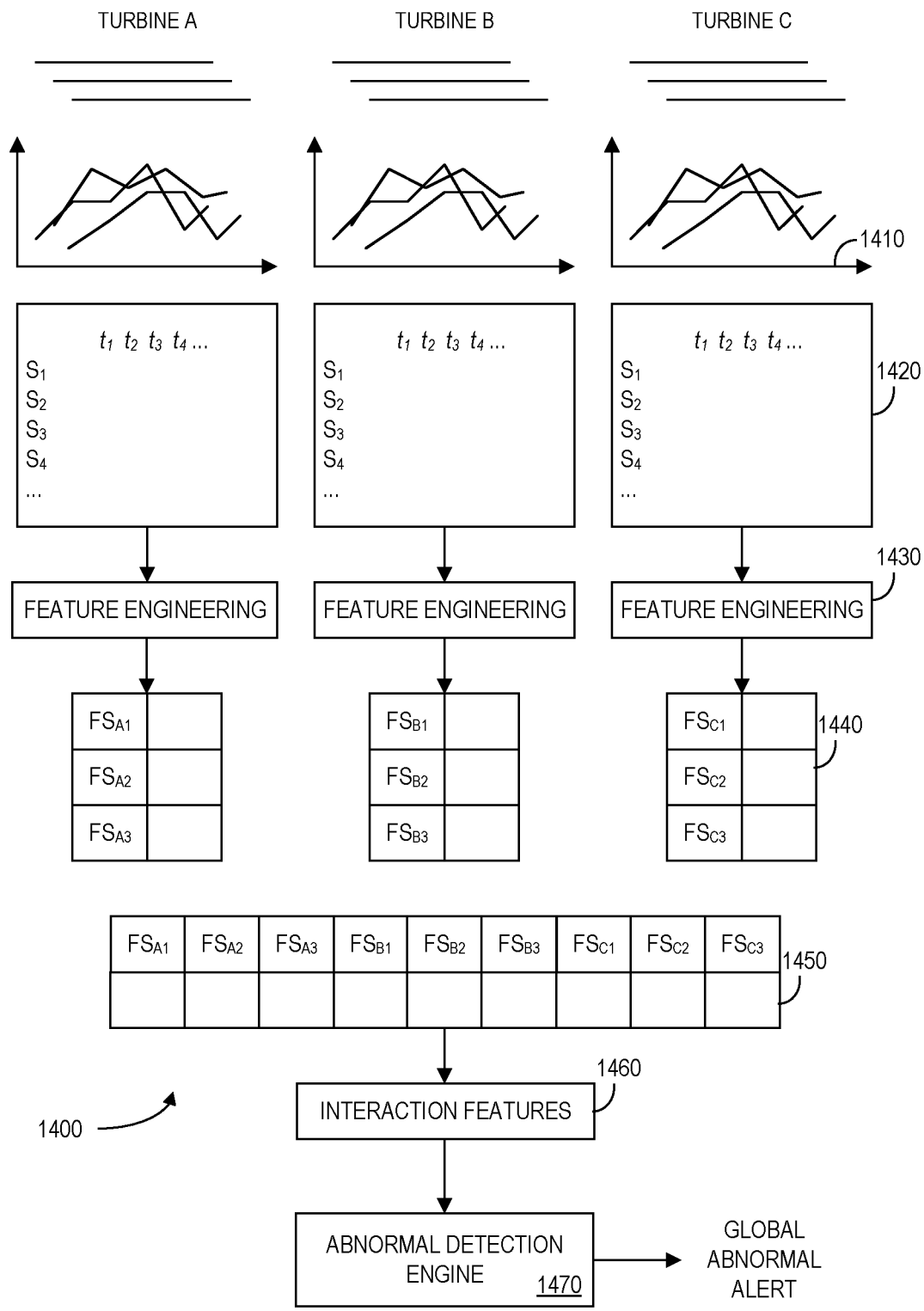
FIG. 14 is an example of a global abnormality protection system in accordance with some embodiments when multiple gas turbines are involved in a system.

Feature vectors, including those based on data-driven values, may be generated on a monitoring-node-by-monitoring node basis and may be considered "local" to each particular monitoring node. FIG. 14 is an example of a "global" abnormality protection system 1400 in accordance with some embodiments when multiple gas turbines are involved in a system. In particular, the system 1400 includes three turbines (A, B, and C) and batches of values 1410 from monitoring nodes are collected for each generated over a period of time (e.g., 60 to 80 seconds). According to some embodiments, the batches of values 1410 from monitoring nodes overlap in time. The values 1410 from monitoring nodes may, for example, be stored in a matrix 1420 arranged by time ($t_1$, $t_2$, etc.) and by type of monitoring node ($S_1$, $S_5$, etc.). Feature engineering components 1430 may use information in each matrix 1420 to create a feature vector 1440 for each of the three turbines (e.g., the feature vector 1440 for turbine C might include $FS_{C1}$, $FS_{C2}$, etc.). The three feature vectors 1440 may then be combined into a single global feature vector 1450 for the system 1400. Interaction features 1460 may be applied (e.g., associated with A*B*C, A+B+C, etc.) and an anomaly detection engine 1470 may compare the result with a decision boundary and output a global abnormal alert signal when appropriate.

According to some embodiments, the global feature vector may also contain interactive feature involving two or more monitoring nodes, e.g. cross-correlation between two nodes. The rate of change of the time-domain signals or the rate of change of the features may also be used as additional features. The features may be normalized using some base values such as those in at-rated wind speed condition. The dimension of the global feature vector can then be further reduced using any dimensionality reduction technic such as PCA. The features are calculated over a sliding window of the signal time series, and the length of the window and the duration of slide may be determined from domain knowledge and/or inspection of the data or using batch processing.

Figure 15:
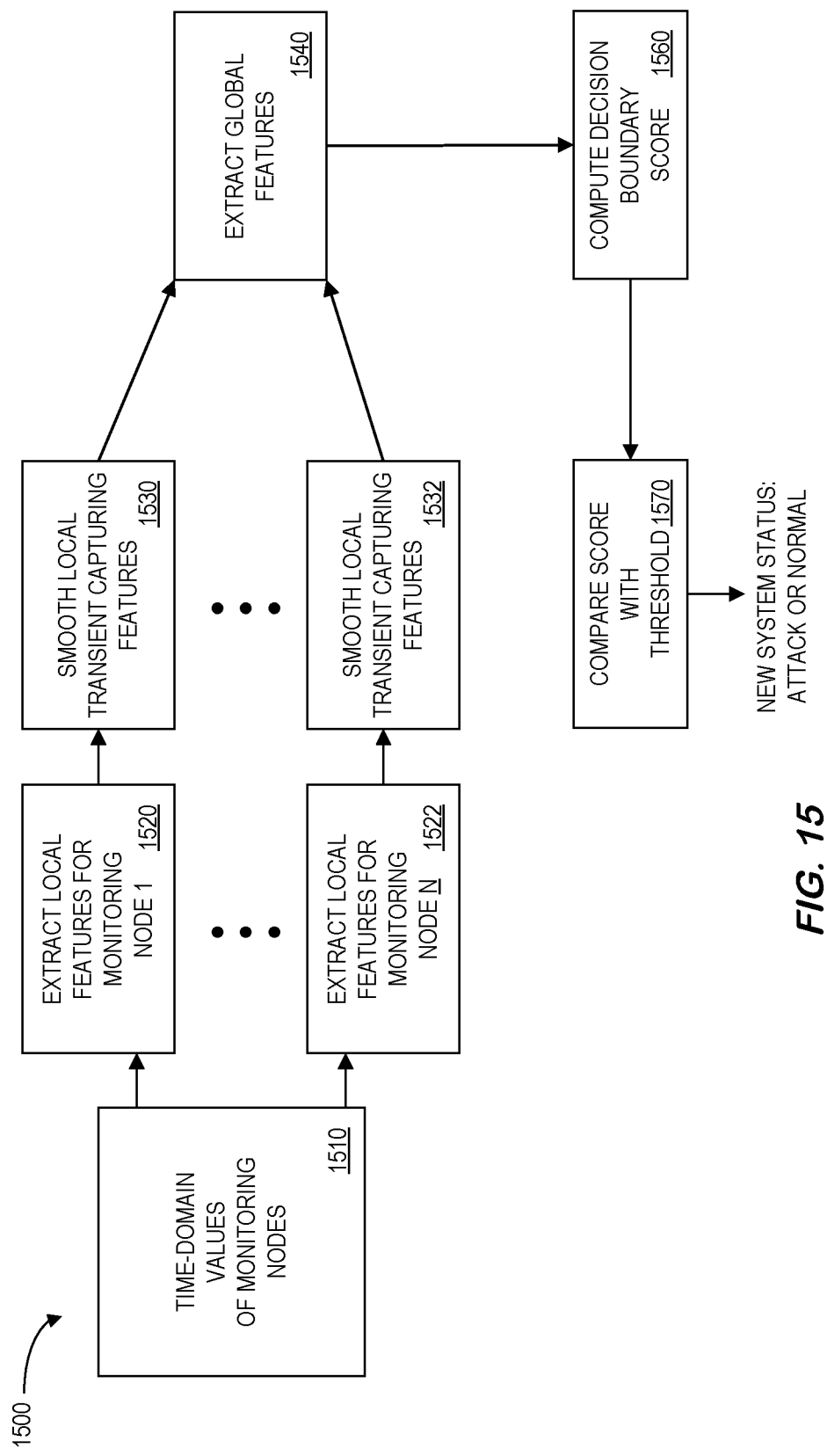
FIG. 15 is a high-level block diagram of a system to protect an industrial asset according to some embodiments.

For example, FIG. 15 is a high-level block diagram of a system 1500 to protect an industrial asset according to some embodiments. The system 1500 extracts local features for monitoring nodes 1-N 1520, 1522 from time-domain values 1510. The system 1500 then smooths local transient capturing features for each node 1530, 1532 (e.g., via band-pass filters). The system 1500 may also, according to some embodiments, extract global features 1540 and compute a decision boundary score 1560. The decision boundary score 1860 can then be compared to a threshold value 1570 to determine if the new system status of the industrial asset is "attack" or "normal."

With respect to key features for capturing local transients, some embodiments may be associated with local transient capturing features of time-domain node values. For example, the local feature vector for each monitoring node might comprise of a set of "base features," which may be of any of the types described herein, augmented by a set of "transient capturing features" that provide, in rapid scale, a sense for the notion of change in the environment. In other words, the transient capturing features may characterize how fast the environment is evolving. In the following, a few types of transient capturing feature types will be described to enable such a distinguishing nature of rapid changes. The following description is for illustration purposes only and the transient capturing features are not limited to these specific types.

Some local transients capture features may be associated with time-derivative local features of the time-domain values. That is, one particular type of transient capturing features might be the time derivate(s) of the monitoring node values. To this end, numerical differentiation can be used with central or backward finite differences. The numerical derivatives may be computed using the last points of the batched data. The number of points needed might be selected based on the order and type of the differentiation method. For example, the first and second derivatives using backward finite difference for monitoring node $x_1$ are:

$$\frac{dx_1}{dt}(t) = \frac{x_1(t) - x_1(t - T_s)}{T_s}$$

$$\frac{d^2 x_1}{dt^2}(t) = \frac{x_1(t) - 2x_1(t - T_s) + x_1(t - 2T_s)}{T_s^2}$$

where $T_s$ is the sampling time. Higher-order derivatives are also possible to compute, but for practical reasons (and depending on how noisy the data is) numerical differentiation beyond first and second derivatives may be impractical. The above computations are simple and low cost, and no additional storage might be required since a batch of time-series data (usually of the length of several $T_s$) may enter the system as each sampling time.

Transit capturing features can also be extracted as the features of the base features, capturing the evolution of the base features for each monitoring node. These are essentially "features of features." For example, time-derivative features of the local base features might be employed. These may be similar to the time-derivative features of the monitoring node values described above, and time-domain derivatives of the base features may also be computed from feature evolution time-series data. For example, if $w_1^1$ is the first local base feature of the first monitoring node $x_1$, then:

$$\frac{dw_1^1}{dt}(t) = \frac{w_1^1(t) - w_1^1(t - T_s)}{T_s}$$

$$\frac{d^2 w_1^1}{dt^2}(t) = \frac{w_1^1(t) - 2w_1^1(t - T_s) + w_1^1(t - 2T_s)}{T_s^2}$$

Note that, similar to the time-domain values of the monitoring nodes, after the base features are extracted, time-domain values of base features may also be readily available for each sliding batch. Also note that the sampling time, $T_s$, may not be same as the local features of time-domain data. Here again, the computations may be low-cost but additional storage may be needed since they involve features computed from previous batches of data.

Other embodiments might be associated with local "Jacobian features." Local Jacobian features are the partial derivatives of a base feature of a monitoring node with respect to another base feature of the same monitoring node. Suppose the local base feature vectors of an example monitoring node $x_1$ are $W^1 = [w_1^1 \ldots w_{f_1}^1]^T$, where $f_1$ is the number of local base features of the monitoring node $x_1$. The Jacobian of vector field $W^1$ with respect to itself, is a matrix with the main diagonal elements being 1:

$$J_{W^1}(W^1) = \begin{bmatrix} 1 & \frac{\partial w_1^1}{\partial w_2^1} & \cdots & \frac{\partial w_1^1}{\partial w_{f_1}^1} \\ \frac{\partial w_2^1}{\partial w_1^1} & 1 & \cdots & \frac{\partial w_2^1}{\partial w_{f_1}^1} \\ \vdots & \vdots & \ddots & \vdots \\ \frac{\partial w_{f_1}^1}{\partial w_1^1} & \frac{\partial w_{f_1}^1}{\partial w_2^1} & \cdots & 1 \end{bmatrix}$$

In this case, the local Jacobian features of $x_1$ are the non-diagonal elements of this matrix. Additionally, the properties of this matrix such as its trace, determinant, eigenvalues, etc. can be considered as local transit capturing features. The partial derivatives can be numerically computed using central or backward finite differences. For example, using backward finite differences:

$$\frac{\partial w_1^1}{\partial w_2^1}(t) = \frac{w_1^1(t) - w_1^1(t - T_s)}{w_2^1(t) - w_2^1(t - T_s)}$$

The local Jacobian features of the base features of other monitoring nodes may be computed in a similar fashion. Having n monitoring nodes each having $f_i$, i=1, . . . , n local base features, in general, there exists n of such Jacobian matrices, each having $f_i * (f_i - 1)$ time-varying elements.

Still other embodiments may be associated with local Hessian features. The Hessian of a vector field with respect to another vector field (or itself) is a tensor of order three, which can be shown as an array of Hessian matrices of each element of the vector field with respect to the other (or the same) vector field. In this case, for example, the Hessian of a vector field $W^1$ (local base features of monitoring node xi) with respect to itself is:

$$H_{W^1}(W^1) = \{H_{W^1}(w_1^1), H_{W^1}(w_2^1), \ldots, H_{W^1}(w_{f_1}^1)\}$$

For instance, $H_{W^1}(w_1^1)$ is the Hessian of the first local base feature $w_1^1$ with respect to the local base feature vector $W^1$, which is:

$$H_{W^1}(w_1^1) = \begin{bmatrix} 0 & 0 & \cdots & 0 \\ 0 & \frac{\partial^2 w_1^1}{\partial (w_2^1)^2} & \cdots & \frac{\partial^2 w_1^1}{\partial w_2^1 w_{f_1}^1} \\ \vdots & \vdots & \ddots & \vdots \\ 0 & \frac{\partial^2 w_1^1}{\partial w_{f_1}^1 w_2^1} & \cdots & \frac{\partial^2 w_1^1}{\partial (w_{f_1}^1)^2} \end{bmatrix}$$

Note that the first row and first column of this matrix are zero. For monitoring node $x_1$ with $f_1$ local base feature, there are $f_1$ such Hessian matrices. The local Hessian features of node $x_1$ are the non-zero elements of those matrices. The second partial derivate can also be computed numerically using central or backward finite differences. More efficiently, the Hessian matrix may be computed using Hessian Automatic Differentiation ("HAD").

The local features for each monitoring node (e.g., after de-noising) may be stacked to create a global feature vector. The global feature vector may also contain interactive feature involving two or more monitoring nodes, e.g. cross-correlation between two nodes. According to some embodiments, the features may be normalized. The dimension of the global feature vector can then be further reduced using any dimensionality reduction technique such as PCA. Note that the transient capturing features may be left out of such dimensionality reduction. The features may be calculated over a sliding window of the signal time-series. The length of the window and the duration of slide might be determined, for example, from domain knowledge and inspection of the data, detection performance, and computing resources. The interactive global features may also contain global transit capturing features involving two or more nodes.

Global transient capturing features are essentially the partial derivatives of a time-domain values of a monitoring node with respect to other monitoring nodes, or the partial derivatives of the local features of a monitoring node with respect to the local features of other monitoring nodes. According to some embodiments, global transient capturing features of time-domain node values may be utilized, such as a Jacobian feature of the time-domain values of the monitoring nodes. These features may be computed as the first partial derivatives of time-domain values of a monitoring node with respect to another node. For example, suppose there are n monitoring nodes, $X = [x_1, x_2, \ldots, x_n]^T$. The Jacobian of vector field X with respect to itself is:

$$J_X(X) = \begin{bmatrix} 1 & \frac{\partial x_1}{\partial x_2} & \cdots & \frac{\partial x_1}{\partial x_n} \\ \frac{\partial x_2}{\partial x_1} & 1 & \cdots & \frac{\partial x_2}{\partial x_n} \\ \vdots & \vdots & \ddots & \vdots \\ \frac{\partial x_n}{\partial x_1} & \frac{\partial x_n}{\partial x_2} & \cdots & 1 \end{bmatrix}$$

The off-diagonal elements can then be considered as global transit capturing features. The partial derivatives can be computed using central or backward finite differences. For example, using backward finite differences:

$$\frac{\partial x_1}{\partial x_2}(t) = \frac{x_1(t) - x_1(t - T_s)}{x_2(t) - x_2(t - T_s)}$$

Other embodiments may use a Hessian feature of the time-domain values of the monitoring nodes. This is the Hessian of the vector field X with respect to itself, a tensor of order three which is represented by an array of Hessian matrices, similar to the local Hessian features:

$$H_x(X) = \{H_x(x_1), H_x(x_2), \ldots, H_x(x_n)\}$$

For example, for $H_x(x_1)$:

$$H_X(x_1) = \begin{bmatrix} 0 & 0 & \cdots & 0 \\ 0 & \frac{\partial^2 x_1}{\partial (x_2)^2} & \cdots & \frac{\partial^2 x_1}{\partial x_2 x_n} \\ \vdots & \vdots & \ddots & \vdots \\ 0 & \frac{\partial^2 x_1}{\partial x_n x_2} & \cdots & \frac{\partial^2 x_1}{\partial (x_n)^2} \end{bmatrix}$$

Note that there are n of such Hessian matrices, each having $(n-1)^2$ non-zero elements. The Hessian matrix of the measurements of a physical system, satisfies Schwartz condition of continuous partial differentiability and is, therefore, symmetric. Hence, there are $n(n-1)/2$ distinct time-varying elements in each matrix which can be considered as global transit capturing features. Note that each Hessian matrix can then be computed using numerical or automatic differentiation.

Some embodiments may utilize global transient capturing features of the local features. For example, a Jacobian of the local features vector of one node with respect to another. Note that the global Hessian feature of the feature is computed as the second partial derivative of one feature of a mentoring node, with respect to the vector field of the local features of another monitoring node. For instance, the Jacobian of $W^1$ (local base features of monitoring node $x_1$) with respect to the vector field $W^2$ (local base features of monitoring node $x_2$) is a $f_1 * f_2$ matrix:

$$J_{W^2}(W^1) = \begin{bmatrix} \frac{\partial w_1^1}{\partial w_1^2} & \frac{\partial w_1^1}{\partial w_2^2} & \cdots & \frac{\partial w_1^1}{\partial w_{f_2}^2} \\ \frac{\partial w_2^1}{\partial w_1^2} & \frac{\partial w_2^1}{\partial w_2^2} & \cdots & \frac{\partial w_2^1}{\partial w_{f_2}^2} \\ \vdots & \vdots & \ddots & \vdots \\ \frac{\partial w_{f_1}^1}{\partial w_1^2} & \frac{\partial w_{f_1}^1}{\partial w_2^2} & \cdots & \frac{\partial w_{f_1}^1}{\partial w_{f_2}^2} \end{bmatrix}$$

Some embodiments may use a Hessian of the features of one node with respect to another. In this case, a global Hessian feature of the feature may be computed as the second partial derivative of one feature of a mentoring node with respect to the vector field of the local features of another monitoring node. For instance, the Jacobian of $W^1$ (local base features of monitoring node $x_1$) with respect to the vector field $W^2$ (local base features of monitoring node $x_2$):

$$H_{w^2}(W^2) = \{H_{w^2}(w_1^1), H_{w^2}(w_1^2), \ldots, H_{w^2}(w_{f_1}^1)\}$$

where $H_{w^2}(w_1^1)$ is the Hessian of $w_1^1$ (first local feature of node $x_1$) with respect to the vector field $W^2$ (local base features of monitoring node $x_2$). Having n monitoring nodes, the global Hessian feature of features will be the elements of n such tensors (each being an array of matrices).

According to some embodiments, an HMM-based mode estimator is trained off-line using training datasets with labels of the true controller mode. The training may provide the state transition and the state-to-emission probability matrices. Having the trained HMM, then during the real-time operation the Viterbi algorithm may estimate the hidden state using posterior probabilities. This estimation may be made under the assumption that sensor/actuator measurements are healthy (i.e., not attacked). However, in case of a multipronged attack, chances are the attacker attacks the controller mode and some of the monitoring nodes at the same time. To tackle this problem, the inputs to the mode estimating HMM may be adjusted according to the system status. If per global detection classifier, the system status is normal, the monitoring nodes time series data may be provided to the HMM as the observations. Once the global system status becomes abnormal, the unhealthy nodes, as determined by an attack detection and localization (e.g., as described with respect to FIGS. 16 through 21) may be removed and/or replaced by virtual estimated values. Note that the features used for the mode estimations may be different from the features used for attack detection and localization.

Figure 16:
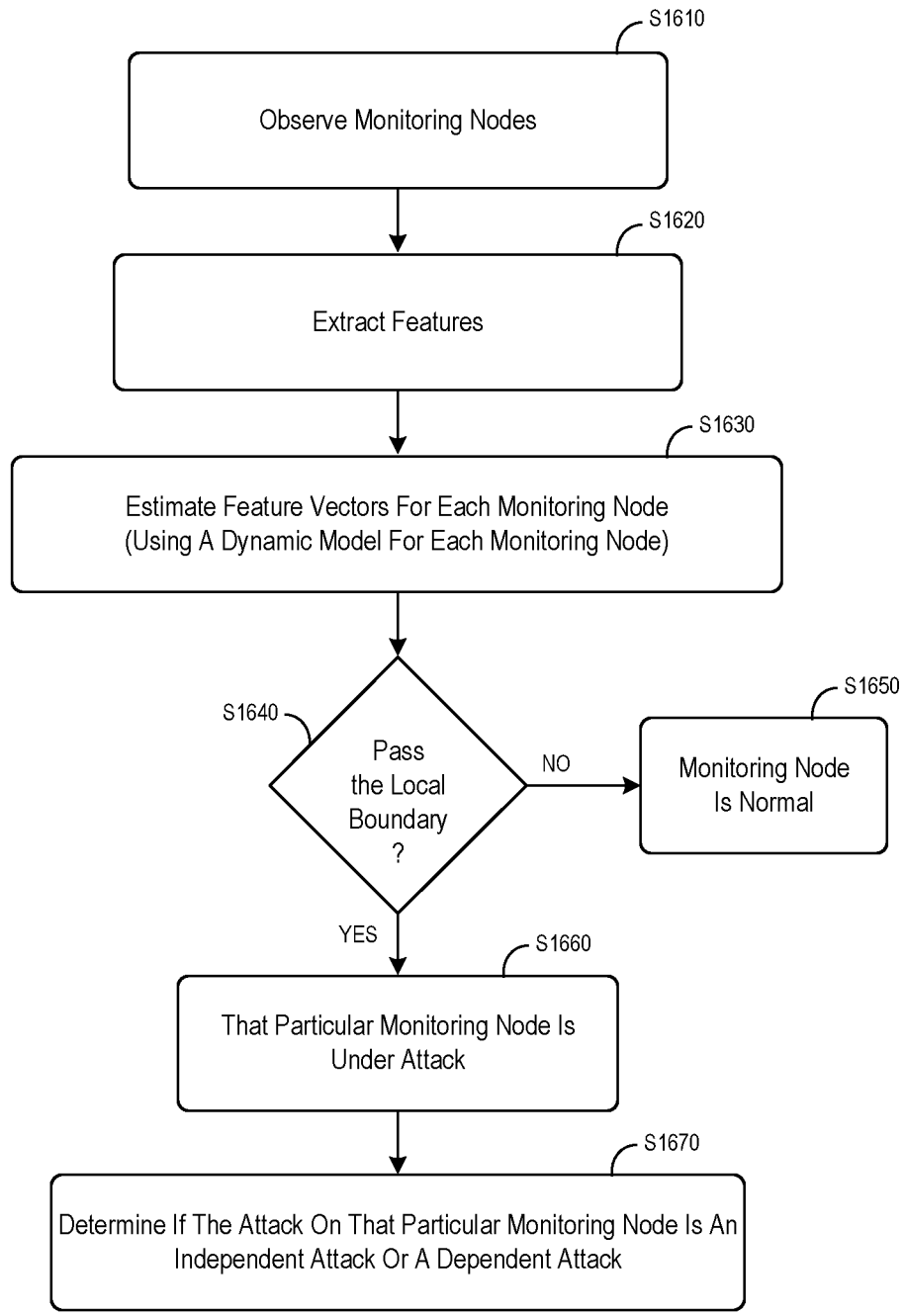
FIG. 16 is a method that might be associated with an on-line operational process in accordance with some embodiments.

FIG. 16 is a method that might be associated with an on-line operational process in accordance with some embodiments. After observing the monitoring nodes at S1610, the features are extracted at S1620 from each observation of each monitoring node. Then using the dynamic models identified in a training phase, each model then generates filtered or estimated features at S1630 using stochastic estimation techniques, such as Kalman filtering. In some embodiments, dynamic models may not be required to further filter or estimate features. The covariance matrix of the process noise needed for the stochastic estimator is readily available here as Q, which can be computed during training phase as the covariance of the error term e(t). Then the output of each stochastic estimator is compared against its corresponding local decision boundary at S1640, also computed and pre-stored during the training phase. If the local boundary is not passed at S1640, the monitoring node is normal at S1650. Each monitoring node with an estimated feature that violates the corresponding decision boundary is reported as being under attack at S1660.

In the next stage, the system post-processes the localized attack and determines whether the detected attack is an independent attack or it is an artifact of the previous attack through propagation of the effects in the closed-loop feedback control system at S1670. This may provide additional information and insight and may be useful when multiple attacks are detected at the same time.

Figure 17:
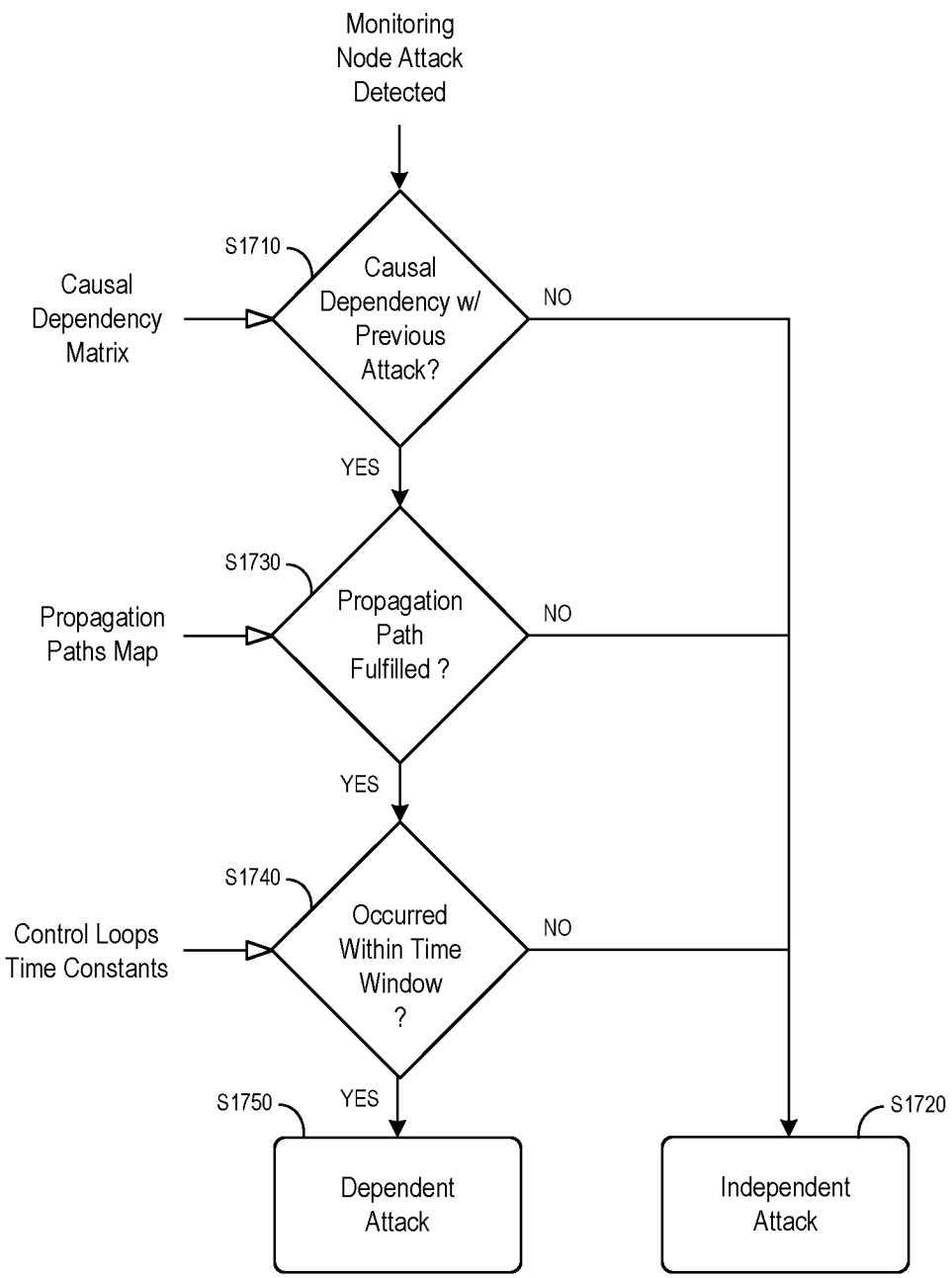
FIG. 17 is a method of determining whether an attack is an independent attack or a dependent attack according to some embodiments.

For example, FIG. 17 is a method of determining whether an attack is an independent attack or a dependent attack according to some embodiments. According to some embodiments, three tests may be performed to determine if an attack should be classified as an "independent attack" or a "dependent attack:" (1) a causal dependency test, (2) a propagation path test, and (3) a time separation test. Together, these three tests are referred to herein as the "attack dependency conformance test." At S1710, a causal dependency matrix may be used to determine if the current attack was potentially caused by a previous attack. If the current attack could not have been caused by a previous attack at S1710, it is classified as an "independent attack" at S1720. In this causality test, the system may check whether there is a potential causal dependency between the newly detected attack and any previously detected attack on other monitoring nodes. This check might be based on, for example, a binary matrix of causal dependencies between any two nodes (e.g., as described with respect to FIG. 21).

The causal dependency matrix might be generated, according to some embodiments, based on domain knowledge. If no such possible dependencies exist, the attack is reported as an "independent attack" at S1720. Otherwise, the system may perform a second check.

In particular, at S1730 a propagation paths map may be used to determine if the current attack potentially propagated from a previous attack. If the current attack could not have propagated from a previous attack at S1730, it is classified as an "independent attack" at S1720. In this propagation test, for each causal dependency the system may check whether a propagation path is fulfilled. This might mean that, for example, if the effect of node 1 being under attack is propagated to node 4, through node 3, then an anomaly in node 1 can cause an anomaly on node 4 only if node 3 is already anomalous. The anomaly propagation paths might also be defined by domain knowledge and pre-stored in the localization system. If no such propagation paths are fulfilled, then the attack is reported an "independent attack" at S1720. Otherwise, the system may perform the third check.

At S1740, control loops time constraints may be used to determine if the current attack was potentially caused by a previous attack based on time separation. If the current attack could not have been caused by a previous attack based on time separation at S1740, it is classified as an "independent attack" at S1720. This time separation test may utilize the fact that if the attacked monitoring under investigation is an artifact of the closed-loop feedback system, then the effect should arise within a time window between the rise time and the settling time of the control loop corresponding to the monitoring node. However, since the system uses a dynamic estimator, a propagation time may need to be added throughout the estimator. Using n features, and p lags in the models, the dynamic estimator will have n * p states, and therefore adds n * p sampling times delay into the system. Therefore, the expected time window for a dependent attack to occur might be defined by:

$$1.5*\tau+n*p<\Delta t<5*\tau+n*p$$

where $\Delta t$ is the time after any previously detected attacks on other nodes that has passed checks 1 and 2, and $\tau$ is the time constant of the control loop responsible for the current node under investigation. If such a time-separation check is not passed, the system reports the attack as an independent attack at S1720.

If it is determined at S1750 that the current attack meets the time separation test (and, therefore, also meets both the propagation test of S1730 and the causal dependency test of S1740), the current attack is classified as a "dependent attack" at S1750.

Note that other attack and anomaly detection techniques may only provide a binary status of the overall system (whether it is under attack or not). Embodiments described herein may provide an additional layer of information by localizing the attack and determining not only if the system is under attack (or not) but also which node is exactly under attack.

As a result, embodiments may provide a significant and automated solution to attack localization. Note that the attack localization information may be important when responding to the attack, including operator action plans and resilient control under attack. Embodiments described herein may handle multiple simultaneous anomalies in the system, which is beyond the capability of the conventional fault detection systems. This may also let the approaches described herein be used as a fault detection and isolation technique for more sophisticated, multiple-fault scenarios.

Further, distributed detection and localization systems enabled by embodiments described herein across multiple equipment and systems may allow for a coordination of data to detect and precisely pin-point coordinated multi-prong attacks. This may further enable a relatively quick way to perform forensics and/or analysis after an attack.

Note that some embodiments may analyze information in the feature space, which has many advantages over working in the original signal spaces, including high-level data abstraction and modeling high dimensional spaces without adding substantial computational complexity. The feature-based method for localization may also extend feature vectors and/or incorporate new features into existing vectors as new learnings or alternate sources of data become available. Embodiments described herein may also enable use of heterogeneous sensor data in a large scale interconnected system, even when the data comes from many geospatially located heterogeneous sensors (i.e., conventional plant sensors, unconventional sensors such as cell-phone data, logical, etc.). This may offer additional commercial advantages for post-mortem analysis after an attack.

Figure 18:
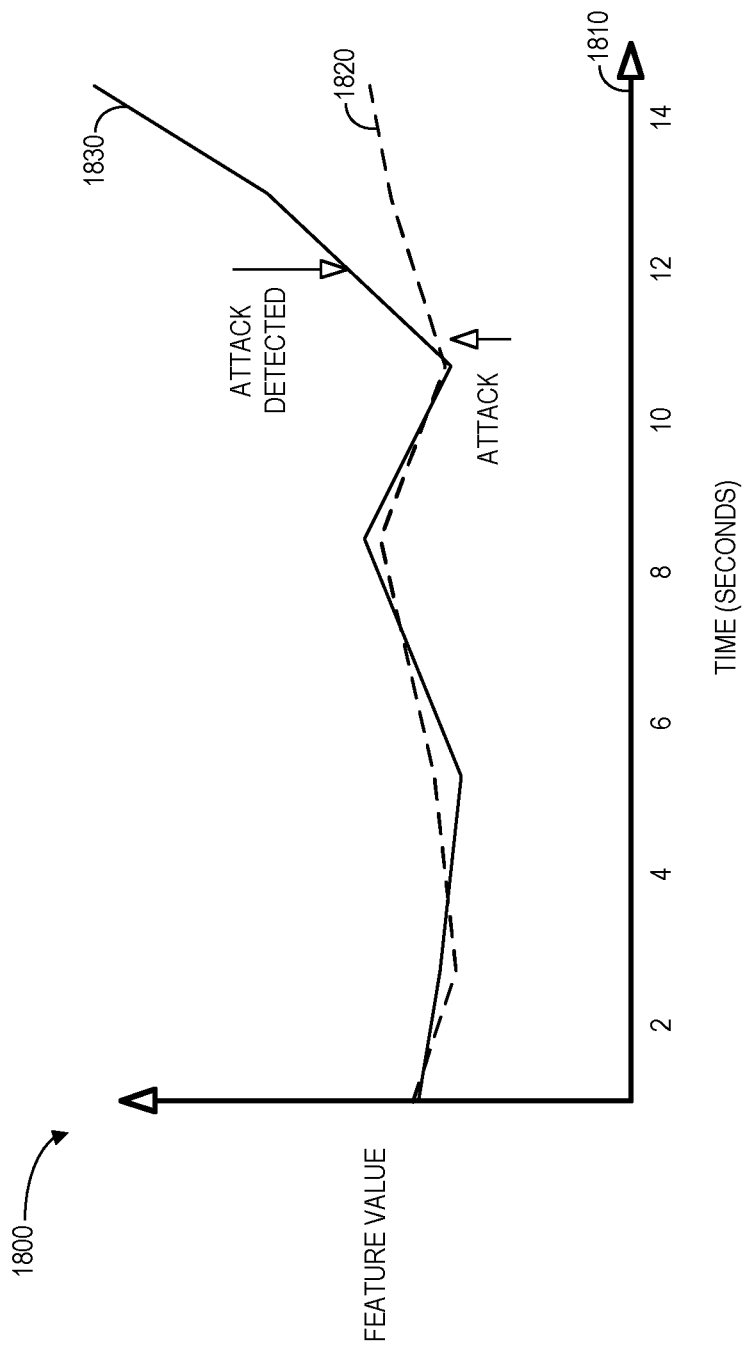
FIG. 18 illustrates a feature time series of an attack comparing the real-time feature of a monitoring node to the modeled feature of the monitoring node according to some embodiments.

FIG. 18 illustrates a feature time series 1800 of a first attack example comparing the real-time feature of a monitoring node to the modeled feature of a monitoring node via a graph 1310 according to some embodiments. In particular, the examples described with respect to FIGS. 18 through 21 involve the following parameters for a gas power turbine:

Compressor Discharge Pressure ("CPD"),
Compressor Discharge Temperature ("CTD"),
Compressor Inlet Temperature ("CTIM"),
Turbine Fuel Flow ("FQG"),
Generator Electrical Power Output ("DWATT"), and
Turbine Exhaust Temperature ("TTXM").

Consider, for example, an attack on TTXM. In this single attack scenario, the system may want to verify whether it can detect and localize the attacked node. As illustrated in FIG. 18, the attack is detected at t=11 sec. Using the embodiments described herein, the attack is detected within 1 sec and correctly localized to TTXM. FIG. 18 shows the measured feature time series of the detected and localized attack 1830 along with the generated features 1820 estimated using stochastic model-based estimation.

Figure 19:
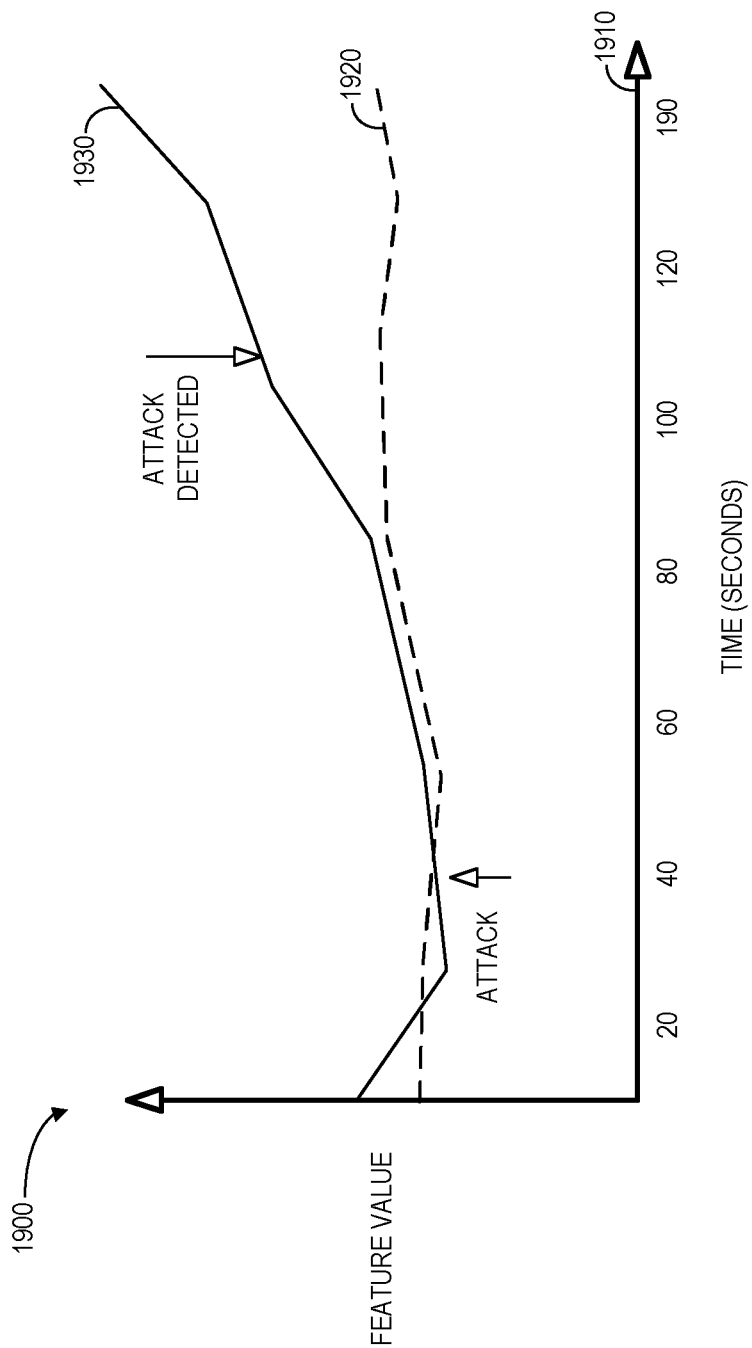
FIG. 19 illustrates a feature time series of a stealthy attack comparing the real-time feature of a monitoring node to the modeled feature of a monitoring node in accordance with some embodiments.
Figure 20:
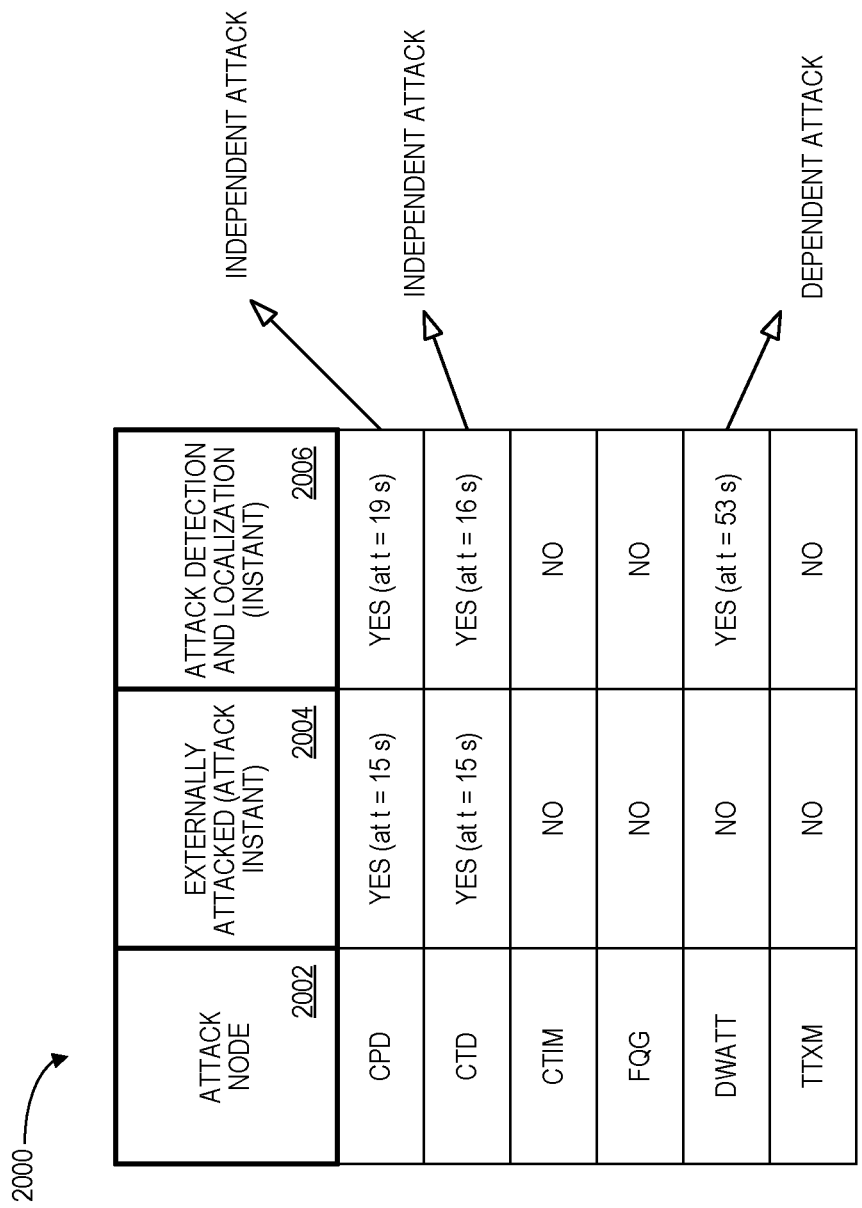
FIG. 20 is an example of attack localization in a multiple-attack scenario according to some embodiments.

FIG. 19 illustrates a feature time series 1900 via a graph 1910 of a second (stealthy) attack comparing the real-time feature of a monitoring ode to the modeled feature of a monitoring node in accordance with some embodiments. That is, this is again an attack on TTXM but this time the attack simulates a stealthy attack in which the sensor is tampered with slowly over time and/or elaborately. Such stealthy attacks are designed to pass the existing fault diagnosis system and can remain in the control system for a long time without being detected. In this simulation, the attack was applied at t=40 sec. Using the localization methods described herein, the attack was detected at t=105 sec, and is correctly localized to TTXM. FIG. 19 shows the measured feature time series of the detected and localized attack 1930 along with the expected features 1920 estimated using the stochastic model-based estimation.

In a third attack scenario, the system may simulate a simultaneous attack on two monitoring nodes. Two sensors are attacked at the same time, namely CPD and CTD, and both attacks are applied at t=15 sec. Using embodiments described herein, both attacks are truly detected and localized within seconds. Out of the other 4 sensors, 3 are correctly not detected at all. One is detected (DWATT) at a later time, which is dependent attack. The results are summarized in the table 2000 of FIG. 20. In particular, the table 2000 lists the attack nodes 2002 along with associated externally attacked data 2004 and attack detection and localization data 2006.

Figure 21:
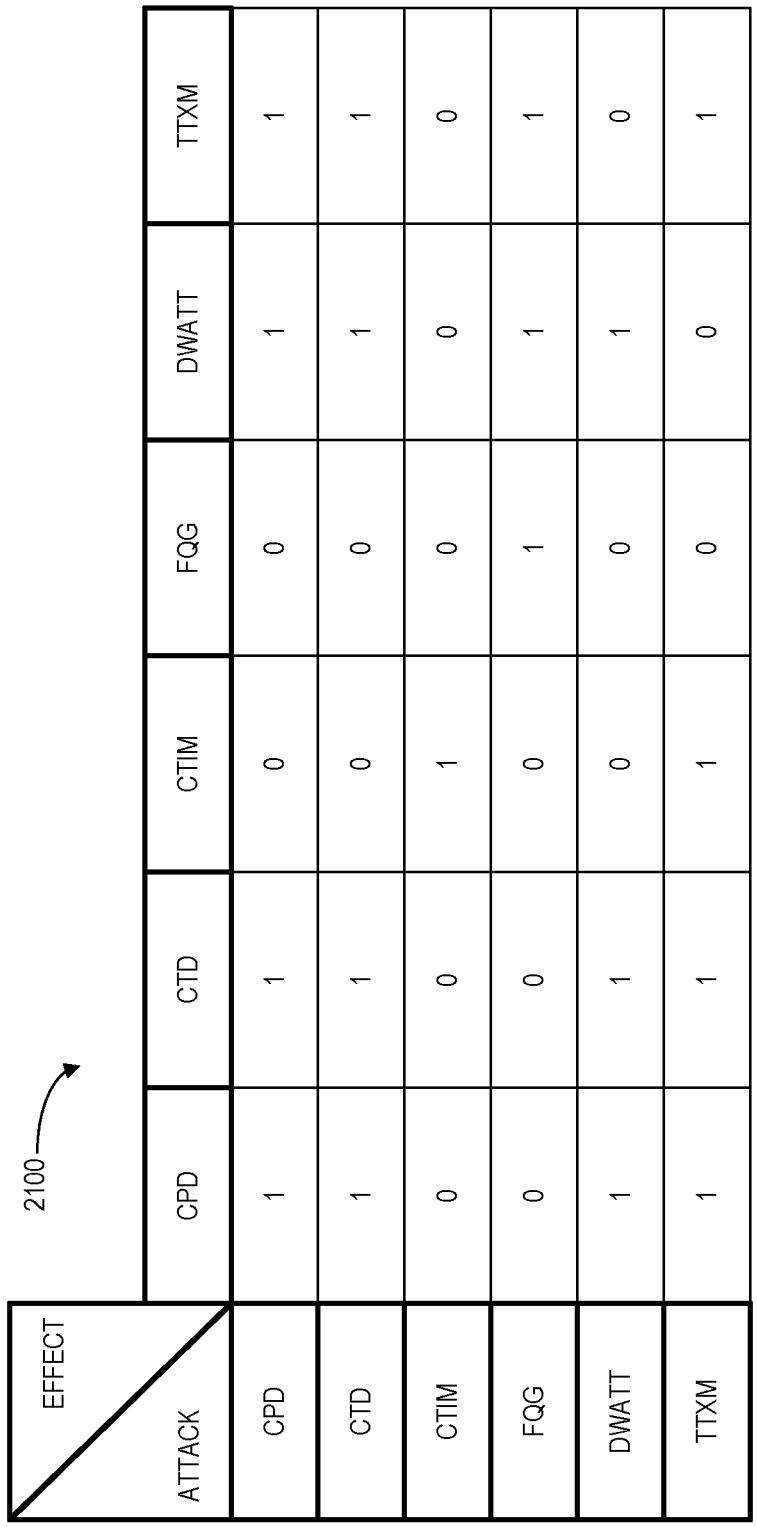
FIG. 21 is a causal dependency matrix of monitoring nodes in accordance with some embodiments.

In this third example (illustrated in the table 2000), there are two externally injected attacks on CPD and CTD. The first attack is detected at t=16 sec and localized to CTD. Since there is no previously detected attack, the causality test fails and this attack is correctly reported as an "independent attack." The second attack is detected at t=19 sec and correctly localized to CPD. In this case, there is causal dependency and a direct proportion path from CTD to CPD. The causal dependency matrix 2100 for this example is shown in FIG. 21. The matrix 2100 lists each potential attack node and whether or not that node can have an effect on each other node (with a "1" indicating a potential effect and a "0" indicating no potential effect).

The second attack therefore passes both the causality test and the proportion test. However, based on time separation criterion, in order for the CPD attack to be a dependent attack it must have happened within $4.25<\Delta t<9.5$ sec after the CTD detection instance. The actual $\Delta t$ illustrated in the table 2000 is 3 sec (that is, 19 sec−16 sec). Therefore, the time separation test is not passed and, as a result, the CPD attack is correctly reported as an "independent attack."

At t=53 sec, the DWATT sensor is also reported as being under attack. Note that there are two previously reported attacks, and the causality and propagation tests pass for both previous attacks (as shown in the matrix 2100). Using the time separation criterion, the DWATT attack instant must be with $15.5<\Delta t<47$ sec after those attacks. The table 2000 lists the actual $\Delta t$ as $\Delta t=53$ sec−16 sec=37 sec for CTD attack and $\Delta t=53$ sec−19 sec=34 sec for CPD attack. So, the time separation test passes for both previous attacks and, therefore, the DWATT attack is correctly reported as a "dependent attack." Note that, based some embodiments described herein, passing the time separation test even for one previously detected attack may still be enough to report DWATT as a dependent attack.

Figure 22:
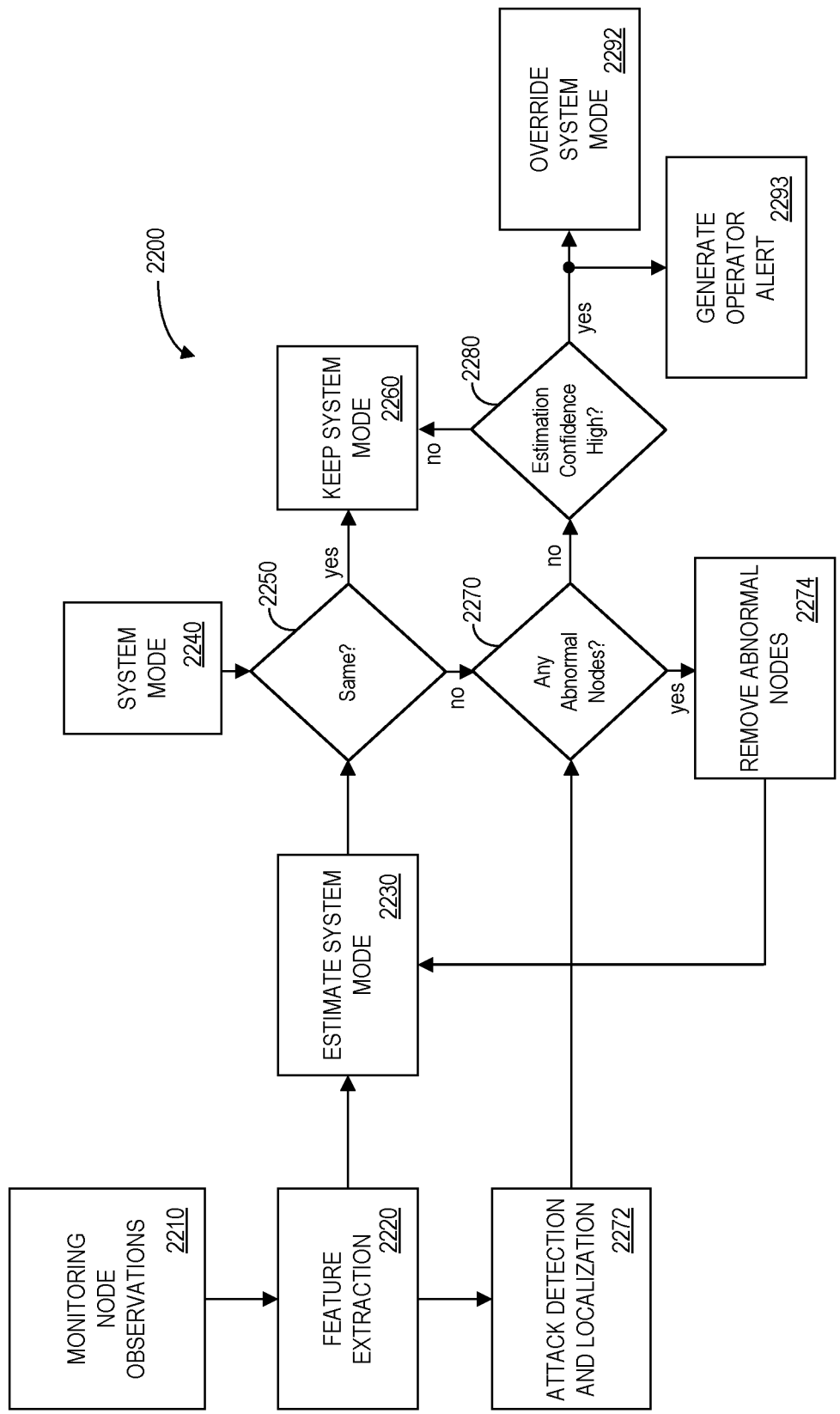
FIG. 22 is a mode switching attack detection and protection system that utilizes a system mode prediction confidence level according to some embodiments.

The localization process described with respect to FIGS. 16 through 21 may be used to remove invalid (attacked or faulty) monitoring nodes from a system mode estimation process. For example, FIG. 22 is a mode switching attack detection and protection system 2200 in accordance with some embodiments. In particular, monitoring node observations 2210 are provided to a feature extraction unit 2220. The feature extraction unit 2220 may output feature vectors to let the system 2200 estimate the system mode 2230. The estimated system mode 2230 is compared to the reported system mode 2240 and, if the results are the same at 2250, no further action needs to be taken 2260 (and the current system mode remains). If the results are not the same at 2250, there is a "mis-match" and the system 2200 may receive data from attack detection and localization 2272 and, if any abnormal nodes 2270 are found they can be removed 2274 and the system mode may again be estimated at 2230.

For the case of simultaneous mode and monitoring node attacks, the minimal subsets of the healthy nodes may be determined to perform simultaneous true mode estimation and attack neutralization. Furthermore, if the HMM estimated mode does not match the current controller mode, action plans are set (based on system specifications) to override the controller mode based on the criticality of the mode at which the controller currently is and the confidence level of the HMM mode estimate. If any node is under attack (or fault) at 2270, its emission is removed from the HMM and the HMM will turn into a HSMM. A HSMM is an extension of HMM, designed to remove the constant or geometric distributions of the state durations assumed in HMM thus can handle missing observation data.

If there still a mode mismatch after abnormal nodes are removed, it is determined if the confidence provided by the probabilistic graphic model is sufficiently high at 2280 (e.g., above a tuning parameter threshold). If not, the currently reported system mode is kept at 2260. If the confidence was sufficiently high at 2280, the system 2200 overrides the system mode at 2292 (and may thus avoid damage to the cyber-physical system). The operator may be notified at 2293 of the mode switching attack detection and that an automatic mode override has happened.

Figure 23:
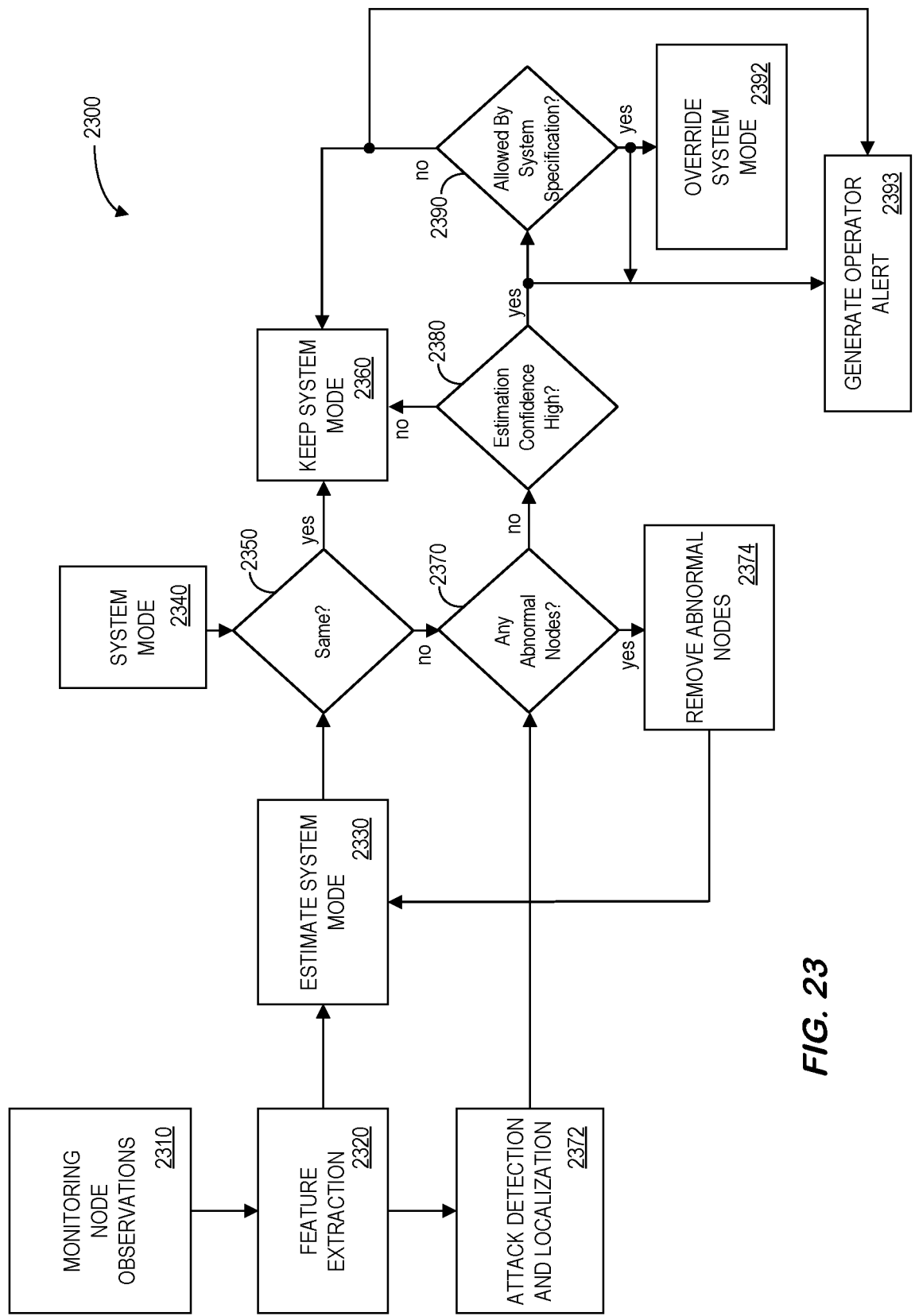
FIG. 23 is a mode switching attack detection and protection system that utilizes a mode switching override system specification in accordance with some embodiments.

In some cases, an override of a system mode may violate safety rules or other regulations. For example, FIG. 23 is a mode switching attack detection and protection system 2200 according to another embodiment. As before, monitoring node observations 2310 are provided to a feature extraction unit 2320. The feature extraction unit 2320 may output feature vectors to let the system 2300 estimate the system mode 2330. The estimated system mode 2330 is compared to the reported system mode 2340 and, if the results are the same at 2350, no further action needs to be taken 2360 (and the current system mode remains). If the results are not the same at 2350, there is a "mis-match" and the system 2300 may receive data from attack detection and localization 2372 and, if any abnormal nodes 2370 are found they can be removed 2374 and the system mode may again be estimated at 2330.

Figure 24:
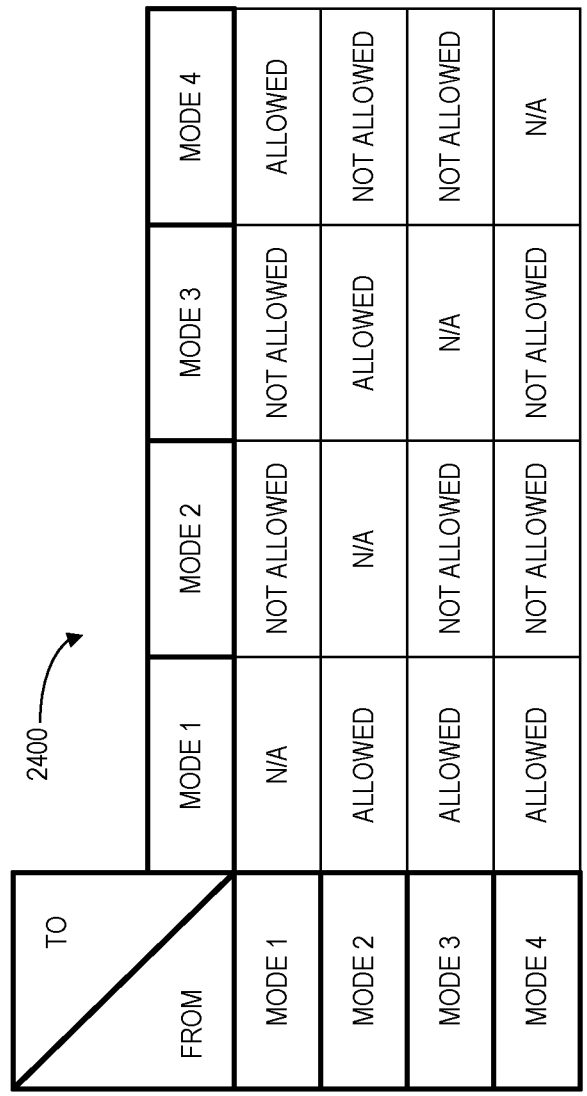
FIG. 24 is a mode switching override system specification according to some embodiments.

If there still a mode mismatch after abnormal nodes are removed, it is determined if the confidence provided by the probabilistic graphic model is sufficiently high at 2380 (e.g., above a tuning parameter threshold). If not, the currently reported system mode is kept at 2360. If the confidence was sufficiently high at 2380, the system 2300 additionally checks to see if an override is allowed (e.g., by predetermined rules or logic in a system specification) at 2390. If an override is not allowed at 2390, the currently reported system mode is kept at 2360. If an override is allowed at 2390, the system overrides the currently reported system mode at 2392 (and may thus avoid damage to the cyber-physical system). FIG. 24 is an example of a system specification table 2400 defining when overrides are allowed (and when they are not allowed). As illustrated, an override from "mode 1" to "mode 3" is not allowed while an override from "mode 4" to "mode 1" is allowed. In either case, the operator may be notified of the mode switching attack detection and whether an automatic mode override is occurred or not at 2393.

Figure 25:
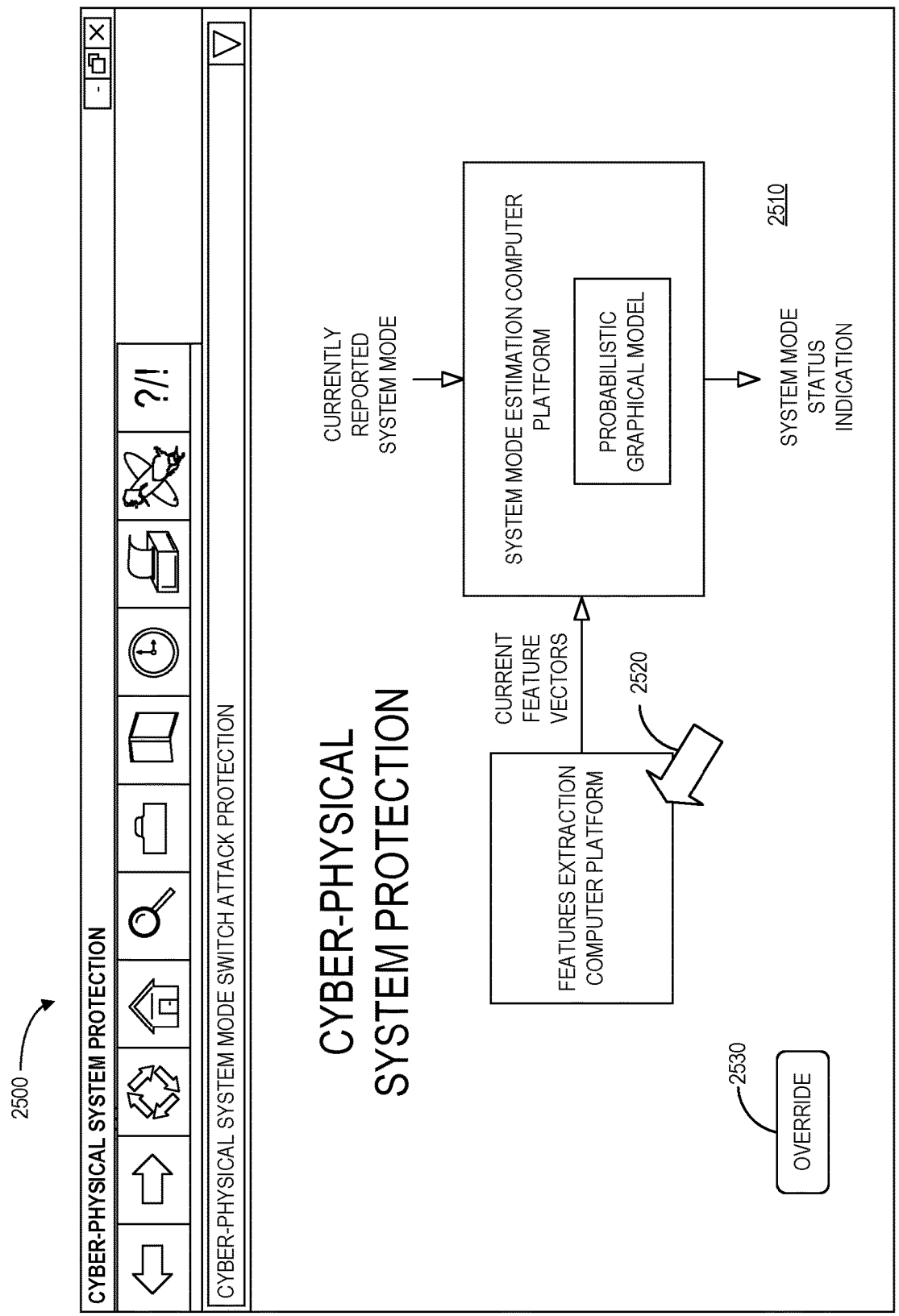
FIG. 25 is a cyber-physical system protection system display in accordance with some embodiments.

FIG. 25 is an example of a cyber-physical system protection display 2500 that might be used, for example, to provide a graphical depiction of a protection system 2510 (e.g., using mode estimation as described herein) to an operator and/or to provide an interactive interface allowing an administrator to adjust system components (e.g., tuning parameters) as appropriate. Selection of an element on the display 2500 (e.g., via a touchscreen or computer mouse pointer 2520) may let the operator see more information about that particular element (e.g., in a pop-up window) and/or adjust operation of that element. Moreover, selection of an "Override" icon 2530 may let an operator or administrator to manually replace a currently reported system mode with an estimated mode.

Figure 26:
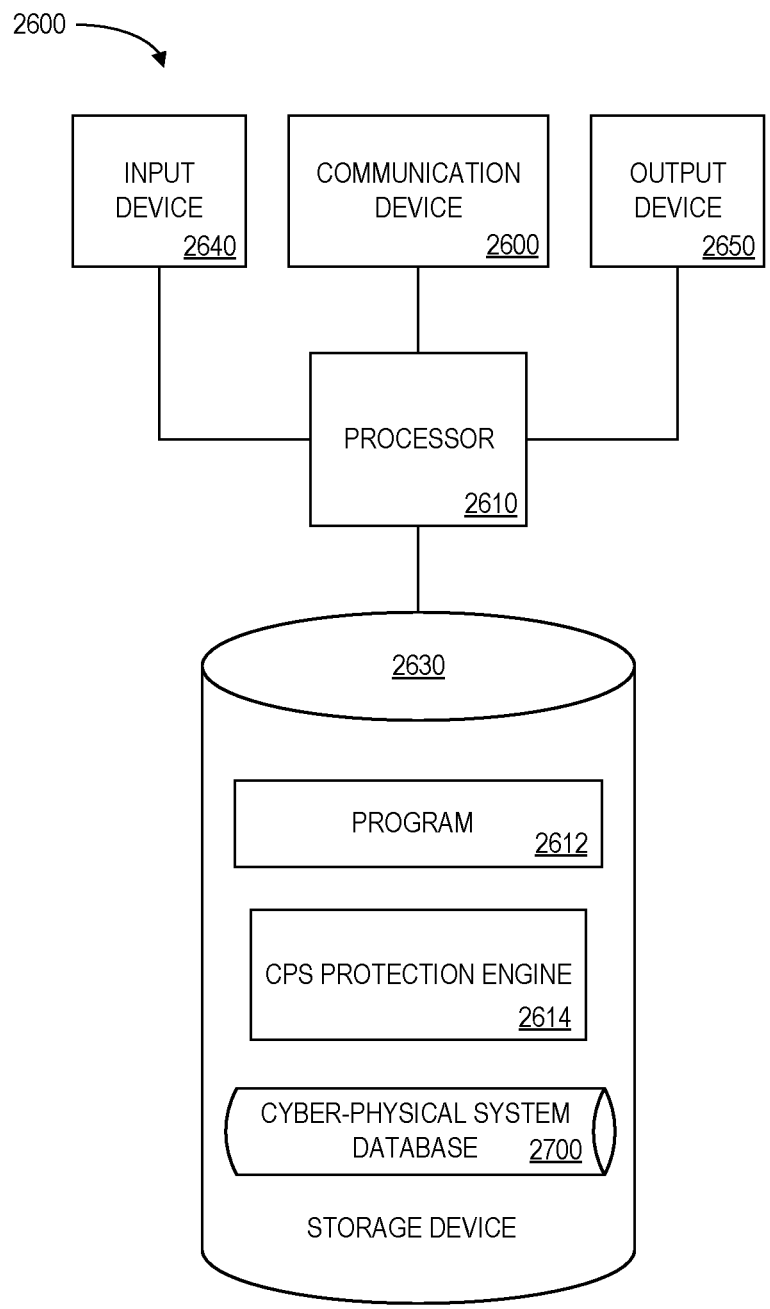
FIG. 26 is a cyber-physical system protection platform according to some embodiments.

Note that the embodiments described herein may be implemented using any number of different hardware configurations. For example, FIG. 26 is a block diagram of a cyber-physical system protection platform 2600 that may be, for example, associated with the systems 100, 300 of FIGS.

1 and 3, respectively, and/or any other system described herein. The cyber-physical system protection platform 2600 comprises a processor 2610, such as one or more commercially available Central Processing Units ("CPUs") in the form of one-chip microprocessors, coupled to a communication device 2620 configured to communicate via a communication network (not shown in FIG. 26). The communication device 2620 may be used to communicate, for example, with one or more remote monitoring nodes, user platforms, digital twins, etc. The cyber-physical system protection platform 2600 further includes an input device 2640 (e.g., a computer mouse and/or keyboard to input cyber-physical system parameters and/or modeling information) and/an output device 2650 (e.g., a computer monitor to render a display, provide alerts, transmit recommendations, and/or create reports). According to some embodiments, a mobile device, monitoring physical system, and/or PC may be used to exchange information with the cyber-physical system protection platform 2600.

The processor 2610 also communicates with a storage device 2630. The storage device 2630 may comprise any appropriate information storage device, including combinations of magnetic storage devices (e.g., a hard disk drive), optical storage devices, mobile telephones, and/or semiconductor memory devices. The storage device 2630 stores a program 2612 and/or cyber-physical system protection engine 2614 for controlling the processor 2610. The processor 2610 performs instructions of the programs 2612, 2614, and thereby operates in accordance with any of the embodiments described herein. For example, the processor 2610 may receive a series of current monitoring node values over time and generate current feature vectors based on the series of current monitoring mode values. The processor 2610 may also provide the current feature vectors to a probabilistic graphical model to generate an estimated system mode. The processor 2610 may then compare the estimated system mode with a currently reported system mode output by the cyber-physical system and generate a system mode status indication based on a result of said comparison. According to some embodiments, the system mode status indication can be used to override the currently reported system mode of the cyber-physical system.

The programs 2612, 2614 may be stored in a compressed, uncompiled and/or encrypted format. The programs 2612, 2614 may furthermore include other program elements, such as an operating system, clipboard application, a database management system, and/or device drivers used by the processor 2610 to interface with peripheral devices.

As used herein, information may be "received" by or "transmitted" to, for example: (i) the cyber-physical system protection platform 2600 from another device; or (ii) a software application or module within the cyber-physical system protection platform 2600 from another software application, module, or any other source.

In some embodiments (such as the one shown in FIG. 26), the storage device 2630 further stores a cyber-physical system database 2700. An example of a database that may be used in connection with the cyber-physical system protection platform 2600 will now be described in detail with respect to FIG. 27. Note that the database described herein is only one example, and additional and/or different information may be stored therein. Moreover, various databases might be split or combined in accordance with any of the embodiments described herein.

Figure 27:
FIG. 27 is portion of a tabular cyber-physical system database in accordance with some embodiments.

Referring to FIG. 27, a table is shown that represents the cyber-physical system database 2700 that may be stored at the cyber-physical system protection platform 2600 according to some embodiments. The table may include, for example, entries identifying cyber-physical systems to be protected and associated monitoring nodes. The table may also define fields 2702, 2704, 2706, 2708, 2710, 2712, 2714 for each of the entries. The fields 2702, 2704, 2706, 2708, 2710, 2712, 2714 may, according to some embodiments, specify: a cyber-physical system identifier 2702, a cyber-physical system description and monitoring node identifier 2704, a reported system mode 2706, local feature vectors 2708, global feature vectors 2710, an estimated system mode 2712, and a system mode status indication 2714. The cyber-physical system database 2700 may be created and updated, for example, when a new physical system is monitored or modeled, an attack is detected, etc.

The cyber-physical system identifier 2702 and description 2704 may define a particular asset or system that will be protected, including node identifiers 2706 (e.g., to specify a sensor, actuator, etc. of the system). As illustrated in FIG. 27, three monitoring nodes ($MN_1$, $MN_2$, and $MN_3$) are all associated with a single cyber-physical system identifier 2702. The local feature vectors 2708 and global feature vectors 2710 may be based on features extracted from times series data for each monitoring node. The vectors 2708, 2710 may then be used to predict or estimate a system mode 2712 for the cyber-physical system. If the estimated system mode 2712 matches the reported system mode 2706 the system mode status indication 2714 is "OK." If the estimated system mode 2712 does not match the reported system mode 2706 (as is the case for "CPS_102") the system mode status indication 2714 is "Alert" and a potential override may be further evaluated.

Thus, embodiments may provide technical improvements to cyber-physical system protection with respect to mode switching attacks. Embodiments may provide redundancy on the system mode information during normal operation and/or auto-correction of unexpected/unwanted control mode changes. As a result, asset protection against unwanted shutdowns may be improved and asset reliability and availability may be increased. Some embodiments may provide an extra safety mechanism against asset damage cause by mode switching attacks.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). Moreover, although some embodiments are focused on gas turbines, any of the embodiments described herein could be applied to other types of cyber-physical systems including power grids, dams, locomotives, additive printers, data centers, airplanes, and autonomous vehicles (including automobiles, trucks, drones, submarines, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system to protect a cyber-physical system having a plurality of monitoring nodes each generating a series of current monitoring node values over time that represent current operation of the cyber-physical system, comprising:
a features extraction computer platform having a memory and a computer processor adapted to:
receive the series of current monitoring node values over time, and
generate current feature vectors based on the series of current monitoring mode values; and
a system mode estimation computer platform having a memory and a computer processor adapted to:
provide the current feature vectors to a probabilistic graphical model to generate an estimated real-time system mode,
compare the estimated real-time system mode with a currently reported system mode output by the cyber-physical system, and
generate a system mode status indication based on a result of said comparison.

2. The system of claim 1, wherein the probabilistic graphical model is associated with at least one of: (i) a hidden Markov model, (ii) a hidden semi-Markov model, (iii) a conditional random fields model, and (iv) a Bayesian network.

3. The system of claim 1, wherein the system mode status indication is used to override the currently reported system mode of the cyber-physical system.

4. The system of claim 3, wherein the override is only performed if a confidence level associated with the estimated real-time system mode is above a pre-determined threshold value.

5. The system of claim 3, wherein the override is only performed when permitted by system specification requirements.

6. The system of claim 1, wherein an abnormality detection and localization process determines that a subset of the monitoring nodes are currently experiencing a cyber-attack or fault and data associated with the subset is not provided to the probabilistic graphical model.

7. The system of claim 6, wherein monitoring node values from at least one node in the subset are replaced with virtual estimated values.

8. The system of claim 1, wherein at least one of the current feature vectors is associated with at least one of: (i) a rate of change of time-domain signals, and (ii) a rate of change of a feature.

9. The system of claim 1, wherein the features extraction computer platform is further adapted to:
compare the current feature vectors with a data-driven feature decision boundary, and
generate an abnormal alert signal.

10. The system of claim 9, wherein at least one decision boundary and abnormal alert signal are associated with a global feature vector.

11. The system of claim 9, wherein at least one decision boundary and abnormal alert signal are associated with a local feature vector.

12. The system of claim 9, further comprising:
a normal space data source storing, for each of the plurality of monitoring nodes, a series of normal monitoring node values over time that represent normal operation of the cyber-physical system; and
an abnormal space data source storing, for each of the plurality of monitoring nodes, a series of abnormal monitoring node values over time that represent abnormal operation of the cyber-physical system,
wherein the features extraction computer platform is further adapted to:
receive the series normal monitoring node values and generate a set of normal feature vectors,
receive the series of abnormal monitoring node values and generate a set of abnormal feature vectors, and
automatically calculate and output the at least one decision boundary for an abnormal detection platform based on the set of normal feature vectors and the set of abnormal feature vectors.

13. A method to protect a cyber-physical system having a plurality of monitoring nodes each generating a series of current monitoring node values over time that represent current operation of the cyber-physical system, comprising:
receiving, at a features extraction computer platform, the series of current monitoring node values over time;
generating, by the features extraction computer platform, current feature vectors based on the series of current monitoring mode values;
providing, by a system mode estimation computer platform, the current feature vectors to a probabilistic graphical model to generate an estimated real-time system mode;
comparing, by the system mode estimation computer platform, the estimated real-time system mode with a currently reported system mode output by the cyber-physical system; and
generating, by the system mode estimation computer platform, a system mode status indication based on a result of said comparison.

14. The method of claim 13, wherein the probabilistic graphical model is associated with at least one of: (i) a hidden Markov model, (ii) a hidden semi-Markov model, (iii) a conditional random fields model, and (iv) a Bayesian network.

15. The method of claim 1, wherein the system mode status indication is used to override the currently reported system mode of the cyber-physical system.

16. The method of claim 15, wherein the override is only performed if a confidence level associated with the estimated real-time system mode is above a pre-determined threshold value.

17. The system of claim 15, wherein the override is only performed when permitted by system specification requirements.

18. A non-transitory, computer-readable medium storing program code, the program code executable by a computer processor to cause the processor to perform a method to protect a cyber-physical system having a plurality of monitoring nodes each generating a series of current monitoring node values over time that represent current operation of the cyber-physical system, the method comprising:
receiving, at a features extraction computer platform, the series of current monitoring node values over time;
generating, by the features extraction computer platform, current feature vectors based on the series of current monitoring mode values;
providing, by a system mode estimation computer platform, the current feature vectors to a probabilistic graphical model to generate an estimated real-time system mode;

comparing, by the system mode estimation computer platform, the estimated real-time system mode with a currently reported system mode output by the cyber-physical system; and generating, by the system mode estimation computer platform, a system mode status indication based on a result of said comparison.

19. The medium of claim 18, wherein an abnormality detection and localization process determines that a subset of the monitoring nodes are currently experiencing a cyber-attack or fault and data associated with the subset is not provided to the probabilistic graphical model.

20. The medium of claim 19, wherein monitoring node values from at least one node in the subset are replaced with virtual estimated values.

21. The medium of claim 18, wherein at least one of the current feature vectors is associated with at least one of: (i) a rate of change of time-domain signals, and (ii) a rate of change of a feature.

* * * * *